US012335728B2

(12) United States Patent
Ben Henda et al.

(10) Patent No.: US 12,335,728 B2
(45) Date of Patent: Jun. 17, 2025

(54) NON-PUBLIC NETWORK AUTHENTICATION IN 5G

(71) Applicant: TELEFONAKTIEBOLAGET LM ERICSSON (PUBL), Stockholm (SE)

(72) Inventors: Noamen Ben Henda, Vällingby (SE); Monica Wifvesson, Lund (SE); David Castellanos Zamora, Madrid (ES); Vesa Lehtovirta, Espoo (FI); Peter Hedman, Helsingborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 775 days.

(21) Appl. No.: 17/432,835

(22) PCT Filed: Feb. 24, 2020

(86) PCT No.: PCT/EP2020/054749
§ 371 (c)(1),
(2) Date: Aug. 20, 2021

(87) PCT Pub. No.: WO2020/173863
PCT Pub. Date: Sep. 3, 2020

(65) Prior Publication Data
US 2022/0159460 A1 May 19, 2022

Related U.S. Application Data

(60) Provisional application No. 62/811,494, filed on Feb. 27, 2019.

(51) Int. Cl.
*H04W 12/069* (2021.01)
*H04W 12/041* (2021.01)
*H04W 12/084* (2021.01)

(52) U.S. Cl.
CPC ....... *H04W 12/069* (2021.01); *H04W 12/041* (2021.01); *H04W 12/084* (2021.01)

(58) Field of Classification Search
CPC .................. H04W 12/069; H04W 12/041; H04W 12/084
See application file for complete search history.

(56) References Cited

U.S. PATENT DOCUMENTS

2019/0268335 A1* 8/2019 Targali .................. H04W 12/72
2021/0051468 A1* 2/2021 Baskaran .............. H04W 48/16
(Continued)

OTHER PUBLICATIONS

3GPP, "3rd Generation Partnership Project; Technical Specification Group Services and System Aspects; Security architecture and procedures for 5G system (Release 15)", 3GPP TS 33.501, V15.3.1, Dec. 2018.
(Continued)

*Primary Examiner* — Barry W Taylor
(74) *Attorney, Agent, or Firm* — Sage Patent Group

(57) ABSTRACT

A method by a core network node of a core network of a wireless communication system for authenticating a user equipment, UE, to the core network includes receiving a first authentication request to authenticate the UE to the core network, determining that the UE should be authenticated by an external authentication entity that is external to the wireless communication system, transmitting a second authentication request to the external authentication entity, the second authentication request identifying the UE, receiving an authentication response from the external authentication entity verifying authenticity of the UE, the authentication response including a master key, and deriving a first key for securing communications with the UE from the master key.

20 Claims, 20 Drawing Sheets

(56) References Cited

U.S. PATENT DOCUMENTS

| | | | |
|---|---|---|---|
| 2021/0144135 A1* | 5/2021 | Prasad | G06F 21/44 |
| 2021/0409939 A1* | 12/2021 | Baskaran | H04W 12/0431 |
| 2022/0070664 A1* | 3/2022 | Stojanovski | H04W 12/122 |
| 2022/0104009 A1* | 3/2022 | Baskaran | H04W 8/04 |
| 2022/0174497 A1 | 6/2022 | Guo et al. | |
| 2023/0231708 A1 | 7/2023 | Palanigounder et al. | |
| 2023/0239689 A1* | 7/2023 | Hu | H04W 12/041 455/410 |

OTHER PUBLICATIONS

3GPP, "3rd Generation Partnership Project; Technical Specification Group Services and System Aspects; Study on security for 5GS enhanced support of Vertical and LAN Services; (Release 16)", 3GPP TR 33.819 V0.2.0, Feb. 2019.

Cablelabs et al., "Vertical—Solution on authentication with EAP-TTLS", 3GPP TSG SA WG3 (Security) Meeting #94, S3-190341, Jan. 28-Feb. 1, 2019, Kochi, India.

Huawei et al., "Solution for NPN network access via PLMN", 3GPP TSG SA WG3 (Security) Meeting #94, S3-190493, Jan. 28-Feb. 1, 2019, Kochi, India.

Qualcomm Incorporated, "TS 23.502: support of secondary slice authentication", 3GPP TSG-SA WG2 Meeting #131, S2-1901454, Feb. 25-Mar. 1, 2019, Santa Cruz—Tenerife.

International Search Report and Written Opinion of the International Searching Authority, PCT/EP2021/072243, mailed Nov. 17, 2021, 11 pages.

Ericsson, SA WG2 Meeting #139E, S2-2003606, "KI#1, New Sol: Solution to support SNPN access using 3rd party credentials via external Credential Provider," Elbonia, May 25-29, 2020, 6 pages.

3GPP TR 23.700-07 v0.4.0 (Jun. 2020); 3rd Generation Partnership Project; Technical Specification Group Services and System Aspects; Study on enhanced support of non-public networks (Release 17), 158 pages.

3GPP S 23.502 v16.5.1 (Aug. 2020); 3rd Generation Partnership Project; Technical Specification Group Services and System Aspects; Procedures for the 5G System (5GS); Stage 2 (Release 16); 594 pages.

3GPP TS 23.501 V16.5.1 (Aug. 2020); 3rd Generation Partnership Project; Technical Specification Group Services and System Aspects; System architecture for 5G System (5GS); Stage 2 (Release 16), 440 pages.

3GPP TS 33.501 V16.3.0 (Jul. 2020); 3rd Generation Partnership Project; Technical Specification Group Services and System Aspects; System architecture and procedures for 5G system (Release 16), 248 pages.

3GPP TS 33.401 v16.3.0 (Jul. 2020); 3rd Generation Partnership Project; Technical Specification Group Services and System Aspects; 3GPP System Architecture Evolution (SAE); Security architecture (Release 16), 170 pages.

Arkko et al., Improved Extensible Authentication Protocol Method for 3rd General Authentication and Key Agreement (EAP-AKA), Network Working Group, RFC 5448, May 2009, 29 pages.

Fajardo et al., "Diameter Base Protocol," Internet Engineering Task Force (IETF), RFC 6733, Oct. 2012, 152 pages.

Aboba et al., "Extensible Authentication Protocol (EAP)," Network Working Group, RFC 3748, Jun. 2004, 67 pages.

Communication pursuant to Article 94(3) EPC mailed Nov. 27, 2024 for European Patent Application No. 21758666.8; 4 pages.

Ericsson; "KI#1, New Sol: Solution to support SNPN access using 3rd party credentials via external Credential Provider"; S2-2004343; SA WG2 Meeting #139; Elbonia; May 25-29, 2020; XP051889665; 5 pages.

3GPP TS 23.734 V16.0.0 (Dec. 2018); 3rd Generation Partnership Project; Technical Specification Group Services and System Aspects; Study on enhancement of 5GS for Vertical and LAN Services; (Release 16); 107 pages.

3GPP TS 23.501 V15.4.0 (Dec. 2018); 3rd Generation Partnership Project; Technical Specification Group Services and System Aspects; System architecture for 5G System (5GS); Stage 2 (Release 15); 236 pages.

3GPP TS 33.401 v15.6.0 (Dec. 2018); 3rd Generation Partnership Project; Technical Specification Group Services and System Aspects; 3GPP System Architecture Evolution (SAE); Security architecture (Release 15), 163 pages.

3GPP TS 23.502 v15.4.1 (Jan. 2019); 3rd Generation Partnership Project; Technical Specification Group Services and System Aspects; Procedures for the 5G System (5GS); Stage 2 (Release 15); 347 pages.

International Search Report and Written Opinion of the International Searching Authority, PCT/EP2020/054749, mailed Mar. 31, 2020, 11 pages.

\* cited by examiner

NON-PUBLIC NETWORK AUTHENTICATION IN 5G

RELATED APPLICATIONS

This application is a national stage application of International Patent Application No. PCT/EP2020/054749, filed Feb. 24, 2020, which claims priority to and the benefit of U.S. Provisional Application No. 62/811,494, filed on Feb. 27, 2019 and entitled "NON-PUBLIC NETWORK AUTHENTICATION IN 5G," the disclosures of which are incorporated in their entirety by reference.

FIELD

The present disclosure relates generally to communications, and more particularly, to wireless communications and related wireless devices and network nodes.

BACKGROUND

A simplified wireless communication system is illustrated in FIG. 1. The system includes a UE 100 that communicates with one or more access nodes 210, 220 using radio connections 107, 108. The access nodes 210, 220 are connected to a core network node 106. The access nodes 210-220 are part of a radio access network 105.

For wireless communication systems pursuant to 3GPP Evolved Packet System, EPS (also referred to as Long Term Evolution, LTE, or 4G) standard specifications, such as specified in 3GPP TS 36.300 and related specifications, the access nodes 220, 220 correspond typically to an Evolved NodeB (eNB) and the core network node 106 corresponds typically to either a Mobility Management Entity (MME) and/or a Serving Gateway (SGW). The eNB is part of the radio access network 105, which in this case is the E-UTRAN (Evolved Universal Terrestrial Radio Access Network), while the MME and SGW are both part of the EPC (Evolved Packet Core network).

For wireless communication systems pursuant to 3GPP 5G System, 5GS (also referred to as New Radio, NR, or 5G) standard specifications, such as specified in 3GPP TS 38.300 and related specifications, the access nodes 103-104 correspond typically to a 5G NodeB (gNB) and the network node 106 corresponds typically to either an Access and Mobility Management Function (AMF) and/or a User Plane Function (UPF). The gNB is part of the radio access network 100, which in this case is the NG-RAN (Next Generation Radio Access Network), while the AMF and UPF are both part of the 5G Core Network (5GC).

The 3GPP security standardization working group SA3 has an ongoing study on the security aspects for the 5G enhancements to support verticals and SGLAN services. The study is being documented in TR 33.819 [1]. The study is a continuation of the architectural study conducted by the architecture standardization working group SA2 and captured in TR 23.734 [2]. The new features are intended to help verticals make use of the 5G System services by either deploying their own standalone 5G System, a concept denoted by standalone Non-Public Network (NPN) or via a PLMN, called non-standalone NPN. An example of such an application is, for example, when a business wants to deploy its own 5G System to provide connectivity to the machines and employees on its site.

The 5G System consists of the access network and the core network. The Access Network (AN) is the network that allows the UE to gain connectivity to the Core Network (CN), e.g. the base station which could be a gNB or an ng-eNB in 5G. The CN contains all the Network Functions (NF) ensuring a wide range of different functionalities such as session management, connection management, charging, authentication, etc. FIG. 2, which is reproduced from TS 23.501 [3] gives a high overview of the 5G architecture for the non-roaming scenario.

The communication links between the UE and the network (AN and CN) are partitioned into two strata. The UE communicates with the CN over the Non-Access Stratum (NAS), and with the AN over the Access Stratum (AS). All the NAS communication takes place between the UE and the Access and connectivity Management Function (AMF) in the CN over the NAS protocol (N1 interface in FIG. 2). One of the most important NAS procedures is the Primary Authentication which is typically performed upon initial registration of the UE. Besides the UE this procedure involves the AMF in the visited PLMN (VPLMN), in case the UE is roaming, and the AUSF/UDM/ARPF in the Home PLMN (HPLM). FIG. 3 (reproduced from TS 33.501 [4]) shows how the primary authentication procedure is initiated. The Security Anchor Function (SEAF) is co-located with the AMF. In the remainder of the description, the terms SEAF and AMF are used interchangeably.

Following the initiation step, the authentication method is selected by the Unified Data Management (UDM) and then performed by the Authentication Server Function (AUSF) and the UE. TS 33.501 [4] mandates the support of two authentication methods. The 5G Authentication and Key Agreement (AKA) is an enhanced version of the EPS AKA described in TS 33.401 [5] for the previous generation of mobile networks, i.e. LTE. The other method, called EAP-AKA', is based on the Extensible Authentication Protocol (EAP) specified in RFC 3748. EAP is a well-established IETF protocol which is flexible and provides an authentication framework allowing the use of different authentication methods called EAP-methods depending on the type of credentials. EAP-AKA' is one of those EAP methods and is specified in RFC 5448 [7]. Other methods include EAP-TLS specified in RFC 5216. FIG. 4 from TS 33.501 [4] shows the EAP-AKA' flow.

For AKA-based methods like 5G AKA and EAP-AKA', it is assumed that the UE is preconfigured with AKA credentials typically stored in the Universal Subscriber Identity Module (USIM). Such credentials include the long-term key K and the Subscription Permanent Identifier (SUM). A successful run of the Primary Authentication procedure leads to the establishment of security keys $K_{AUSF}$ between the AUSF and the UE and the derivative key $K_{SEAF}$ between the SEAF and the UE. The $K_{SEAF}$ is used to derive further keys to secure NAS and AS communication.

TS 33.501 [4] also contains an informative annex (Annex B) describing how EAP-TLS can be used for primary authentication. This feature is optional and is presented as limited for private networks, e.g. not supporting roaming. The annex describes how the certificates are managed. In this setup, it is assumed that UEs are preconfigured with the client certificates and all necessary certificates to be able to verify the server certificate. Similarly, it is assumed that AUSF is preconfigured with the necessary certificate(s). Certificate revocation is handled by the UDM/ARPF.

It is assumed that the UE is provisioned with credentials to access the NPN. Such credentials are henceforth referred to as the NPN credentials. However, this does not rule out the case where those credentials are of AKA or non-AKA type, e.g. certificates, username/password, etc. Neither it does overrule scenarios where the UE is provisioned with other credentials, e.g. AKA-credentials to access a PLMN. In the 3GPP context, AKA-credentials or credentials used to access PLMN services are referred to as 3GPP-credentials, and all other credentials are referred to as non-3GPP credentials.

SUMMARY

A method by a core network node of a core network of a wireless communication system for authenticating a user equipment, UE, to the core network, includes receiving a first authentication request to authenticate the UE to the core network, and determining that the UE should be authenticated by an external authentication entity that is external to the wireless communication system. The core network node transmits a second authentication request to the external authentication entity, the second authentication request identifying the UE, and receives an authentication response from the external authentication entity verifying authenticity of the UE. The authentication response includes a master key. The core network node derives a first key for securing communications with the UE from the master key.

In some embodiments, the method further includes performing an extensible authentication protocol, EAP, exchange, with the external authentication entity after transmitting the authentication request to the external authentication entity.

In some embodiments, the core network node includes a first core network node and the method further includes transmitting an identifier associated with the UE to a second core network node in response to receiving the first authentication request, and receiving a message from the second core network node instructing the core network node to transmit the authentication request to the external authentication entity.

In some embodiments, the core network includes a 5GC core network, wherein the first core network node includes a Authentication Server Function, AUSF, node, and wherein the second core network node includes a Unified Data Management, UDM, node.

In some embodiments, the external authentication entity is associated with a non-public network.

In some embodiments, the first authentication request includes a subscriber concealed identity, SUCI, of the UE, and the method further includes determining a subscriber permanent identity, SUPI, of the UE, wherein determining that the UE should be authenticated by the external authentication entity is performed based on the SUCI or the SUPI of the UE.

In some embodiments, determining that the UE should be authenticated by the external authentication entity is performed based on a home network of the UE.

In some embodiments, the core network includes a 5GC core network, the core network node includes a Authentication Server Function, AUSF, node, the master key includes a master session key, MSK, and the first key includes an AUSF security key, $K_{AUSF}$.

In some embodiments, the method further includes transmitting an indication to the UE to derive the first key from the master key.

In some embodiments, determining that the UE should be authenticated by the external authentication entity is performed according to a predetermined static configuration.

In some embodiments, the authentication response message includes an encapsulated message for the UE indicating successful authentication.

In some embodiments, the method further includes transmitting an indication to the UE to derive the first key from the master key in an EAP message in the EAP exchange.

In some embodiments, transmitting the indication includes transmitting the indication in an Anti-Bidding down Between Architectures, ABBA, parameter.

In some embodiments, the first authentication request is received from an Access and Mobility Management Function, AMF, node, in the core network.

A method by a core network node of a wireless communication system for authenticating a user equipment, UE, to the core network, includes receiving a first authentication request to authenticate the UE to a core network, determining that the UE should be authenticated based on a certificate owned by an external authentication entity that is external to a wireless communication system that includes the core network, obtaining an authentication certificate associated with the UE, transmitting a second request to the external authentication entity, the second request identifying the authentication certificate associated with the UE, receiving a response from the external authentication entity verifying validity of the authentication certificate associated with the UE, and deriving a first key for communicating with the UE in response to the response from the authentication entity.

In some embodiments, the method further includes transmitting an identifier associated with the UE to a second core network node in response to receiving the message from the UE, and receiving a message from the second core network node instructing the core network node to authenticate the UE based on a certificate owned by the external authentication entity.

In some embodiments, the core network includes a 5GC core network, wherein the first core network node includes a Authentication Server Function, AUSF, node, and wherein the second core network node includes a Unified Data Management, UDM, node.

In some embodiments, the first authentication request includes a subscriber concealed identity, SUCI, of the UE, and the method further includes determining a subscriber permanent identity, SUPI, of the UE, wherein determining that the UE should be authenticated based on the certificate owned by the external authentication entity is performed based on the SUCI or the SUPI of the UE.

In some embodiments, determining that the UE should be authenticated based on the certificate owned by the external authentication entity is performed based on a home network of the UE.

In some embodiments, the core network includes a 5GC core network, the core network node includes a Authentication Server Function, AUSF, node, the master key includes a master session key, MSK, and the first key includes an AUSF security key, $K_{AUSF}$.

In some embodiments, the method further includes transmitting an indication to the UE to derive the first key from the master key.

In some embodiments, determining that the UE should be authenticated based on the certificate owned by the external authentication entity is performed according to a predetermined static configuration.

In some embodiments, the authentication response message includes an encapsulated message for the UE indicating successful authentication.

In some embodiments, the method further includes transmitting an indication to the UE to derive the first key from the master key in an EAP message.

In some embodiments, transmitting the indication includes transmitting the indication in an Anti-Bidding down Between Architectures, ABBA, parameter.

In some embodiments, the first authentication request is received from an Access and Mobility Management Function, AMF, node, in the core network.

A network node according to some embodiments is configured to receive a first authentication request to authenticate the UE to a core network, determine that the UE should be authenticated by an external authentication entity that is external to a wireless communication system that includes the core network, transmit a second authentication request to the external authentication entity, the second authentication request identifying the UE, receive an authentication response from the external authentication entity verifying authenticity of the UE, the authentication response including a master key, and derive a first key for securing communications with the UE from the master key.

A network node according to some embodiments includes a processor circuit, a transceiver coupled to the processor circuit, and a memory coupled to the processor circuit. The memory includes machine readable program instructions that, when executed by the processor circuit, cause the network node to perform operations of receiving a first authentication request to authenticate the UE to a core network, determining that the UE should be authenticated by an external authentication entity that is external to a wireless communication system that includes the core network, transmitting a second authentication request to the external authentication entity, the second authentication request identifying the UE, receiving an authentication response from the external authentication entity verifying authenticity of the UE, the authentication response including a master key, and deriving a first key for securing communications with the UE from the master key.

A method by a UE in a wireless communication system according to some embodiments includes transmitting a registration message to a core network node of the wireless communication system, receiving an indication from the core network node that the UE should derive a security key for communicating with the core network from a master key, MSK, known to an authentication entity outside the wireless communication system, deriving the security key from the MSK, and securing communications with the core network node using the security key.

In some embodiments, the indication is received in a non-access stratum security establishment message from the core network node.

In some embodiments, the indication is received as part of an extensible authentication protocol, EAP, exchange performed in response to the registration message.

In some embodiments, the indication is received in an Anti-Bidding down Between Architectures, ABBA, parameter, of an EAP message received as part of the EAP exchange.

In some embodiments, the security key includes a Authentication Server Function, AUSF, key, $K_{AUSF}$.

A user equipment, UE, according to some embodiments is configured to transmit a registration message to a core network node of the wireless communication system, receive an indication from the core network node that the UE should derive a security key for communicating with the core network from a master key, MSK, known to an authentication entity outside the wireless communication system, derive the security key from the MSK, and secure communications with the core network node using the security key.

A user equipment, UE, according to some embodiments includes a processor circuit, a transceiver coupled to the processor circuit, and a memory coupled to the processor circuit. The memory includes machine readable program instructions that, when executed by the processor circuit, cause the UE to perform operations of transmitting a registration message to a core network node of the wireless communication system, receiving an indication from the core network node that the UE should derive a security key for communicating with the core network from a master key, MSK, known to an authentication entity outside the wireless communication system, deriving the security key from the MSK, and securing communications with the core network node using the security key.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIGS. 3 and 4 are flow diagrams illustrating messages exchanged in a wireless communication system according to some embodiments.

FIG. 6B illustrates a hierarchy of security keys generated as part of an authentication process according to some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In a Non-Public Network where devices are already pre-provisioned with NPN credentials, it is desirable to authenticate and grant access to a 3rd party 5G domain to those devices using the NPN credentials. To do so, it is desirable to perform the Primary Authentication procedure with such devices using the NPN credentials. One existing solution is currently standardized in TS 33.501 [4]. More precisely, the 5G System supports the EAP framework for the EAP-AKA' method. In the EAP-AKA' the UE endorses the role of the peer, the AMF/SEAF endorses the role of a pass-through authenticator and the AUSF endorses the role of the authentication server. Similarly, the Annex B describing the EAP-TLS methods assumes a similar distribution of the EAP framework roles.

Figure 4:
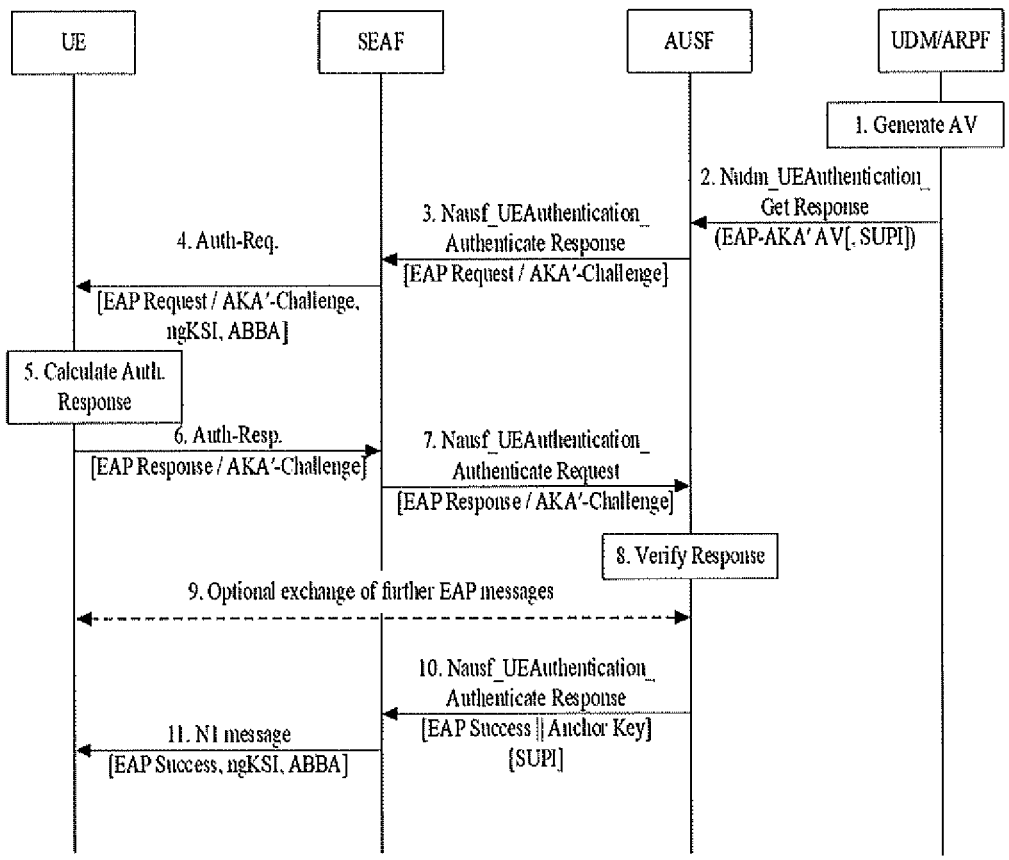
FIG. 4 illustrates an EAP-AKA' procedure.

Although the EAP roles are similar between the methods, the credential management aspects are different. For EAP-AKA' the UDM endorses the role of the credential repository, so the Authentication Vectors (AV) are in fact retrieved from the UDM (see step 1 in FIG. 4). In the EAP-TLS case, the UDM endorses the role of the revocation list server. This dependency on the type of credentials stands out against the desire to support a flexible framework for the verticals. Most likely, depending on the type of the NPN credentials, some customization is required either on the 3GPP NF side (UDM or AUSF) or the NPN legacy authentication infrastructure side in order to realize the support of a primary authentication using the NPN credentials.

More precisely, if the NPN owner wants to use the 3GPP NFs, then the owner must somehow migrate its whole operation for the credential management and storage to the UDM. In addition, depending on the type of credentials, should the AUSF continue to endorse the role of the EAP authentication server, some credential-specific interaction would need to be supported between the UDM and the AUSF.

Another solution would be to outsource the authentication service to an external Authentication, Authorization and Accounting (AAA) server. This is how it is typically done to address similar requirement for the support of a flexible authentication framework. In fact, the 5G system supports another authentication procedure called Secondary Authentication and which is performed during the PDU Session establishment procedure, described in TS 23.502 [6], for authorization purposes. The Secondary Authentication procedure is EAP-based and is described in TS 33.501 [4] where it is assumed that the Session Management Function (SMF) in the CN assumes the role of a passthrough authenticator and interacts with an external AAA server. The support of EAP allows the use of a wide range of well-established methods. The reliance on an AAA anchor in the external domain allows the desired flexibility and interoperability between the CN domain and the authorization credential owners by re-using existing protocols and standards.

Integrating an AAA entity in the Primary Authentication architecture and procedure raises several issues, namely, determining which Network Function (NF) in the CN should connect to the AAA proxy or server in the NPN domain, and determining how the interaction with the AAA is triggered.

Some embodiments described herein provide support for a primary authentication procedure using NPN credentials while still maintaining independence on the type of credentials and reducing/minimizing impact and expectation on the NPN legacy infrastructure other than the support of existing legacy authentication protocols.

Some embodiments described herein may have one or more of the following advantages:

1. They may allow the use of an external AAA entity in the primary authentication procedure to grant access to devices possibly provisioned by credentials from an external domain.
2. They may be independent of the authentication method and enable the use of any EAP method.
3. For key generating authentication methods, they may provide a means to bootstrap the key hierarchy based using the resulting authentication key.

Some embodiments described herein assume that the NPN credentials are managed and stored within the domain of the NPN owner.

For related interactions, such as for the authentication procedure, some embodiments provide that they are terminated in an AAA entity within the NPN domain as well; i.e. an AAA entity that is owned and managed by the actor benefiting from the use of the 5G Services, such as a factory or enterprise owner. The AAA entity could be the legacy AAA server in the existing NPN infrastructure or any other functionality supporting AAA protocols, such as Radius or Diameter.

Figure 5:
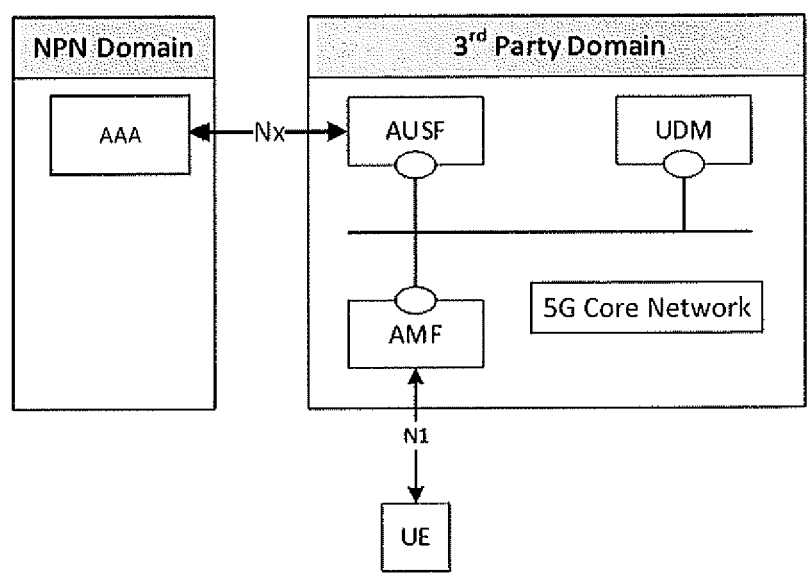
FIG. 5 illustrates an NPN authentication architecture according to some embodiments.

FIG. 5 is a high level block diagram illustrating a UE that accesses a 5G core network, which may be owned or operated privately or by a third party operator. According to some embodiments, the 5G Core Network authenticates the UE through an AAA entity in the NPN domain, i.e., outside the 5G Core Network. In the example shown in FIG. 5, only the AMF, AUSF and UDM NFs are shown in the CN.

According to some embodiments, the AUSF in the CN will interact with the AAA entity in the NPN domain as shown in FIG. 5 through a new interface denoted by Nx. The AUSF behaves in this case as an authentication proxy (AAA-P).

The AMF and other NFs within the 5GC serving network are not impacted by this procedure. An advantage of this is that the authentication procedure flow, from the serving network point of view, is preserved as currently defined. During the authentication procedure, the AMF continues to act as a pass-through authenticator. Another advantage of having the AUSF as the contact point with the AAA in the NPN infrastructure is that it enables use of the Subscriber Permanent Identity (SUM) privacy service and other capabilities provided by the UDM.

In FIG. 5, the 3rd party domain denotes the owner of the 5G Core Network and possibly the Access Network. This could be, for example, the NPN owner or an operator or any other business partner with whom the NPN owner has an SLA.

The Nx interface may be proprietary or standardized, and may be based on legacy AAA protocols, such as Radius or Diameter. In this case, the AUSF is also in charge of translating the SBA based authentication messages to/from the AMF to legacy AAA protocols to/from the AAA in the NPN.

From the AMF perspective, the AUSF is still the EAP authentication server and expects to receive the SEAF Key $K_{SEAF}$ from the AUSF upon the completion of a successful authentication run as described in TS 33.501 [4]. The AMF is agnostic to whether the EAP is actually terminated in the AUSF or somewhere else behind the AUSF. According to some embodiments, the EAP exchange is terminated in the NPN AAA domain, while from the AAA NPN domain, the AUSF is the EAP authenticator and expects to receive the Master Session Key (MSK) at the end of a successful authentication run as described in the EAP RFC.

Figure 6A:
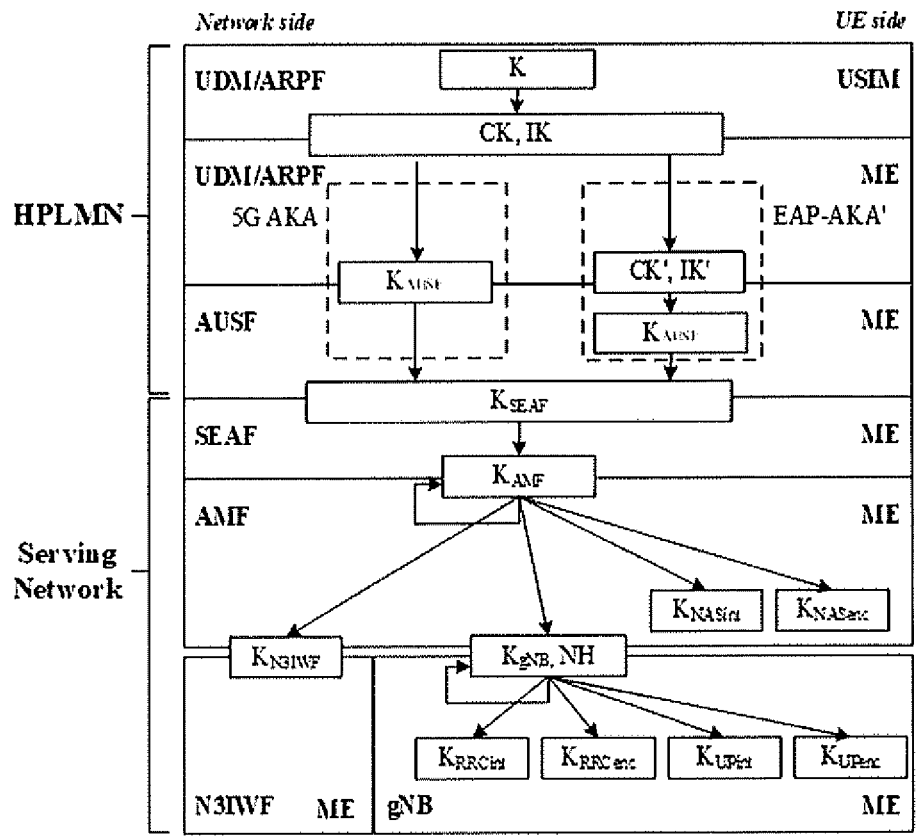
FIG. 6B illustrates a hierarchy of security keys generated as part of a conventional authentication process.

FIG. 6A, which is reproduced from TS 33.501 [4], illustrates the conventional key generation hierarchy of 5G. As shown in FIG. 6A, a hierarchy of keys is generated within the HPLMN and the serving network on one side and the UE on the other side. The keys are used by the network and the UE for various security/authentication procedures. In the conventional approach, the $K_{AUSF}$ key is shared between the AUSF and the UE. The $K_{AUSF}$ key is generated from the CK, IK keys provided to the AUSF by the UDM/ARPF. The $K_{AUSF}$ key is used to generate the $K_{SEAF}$ key, which is shared between the UE and the SEAF.

Figure 6B:
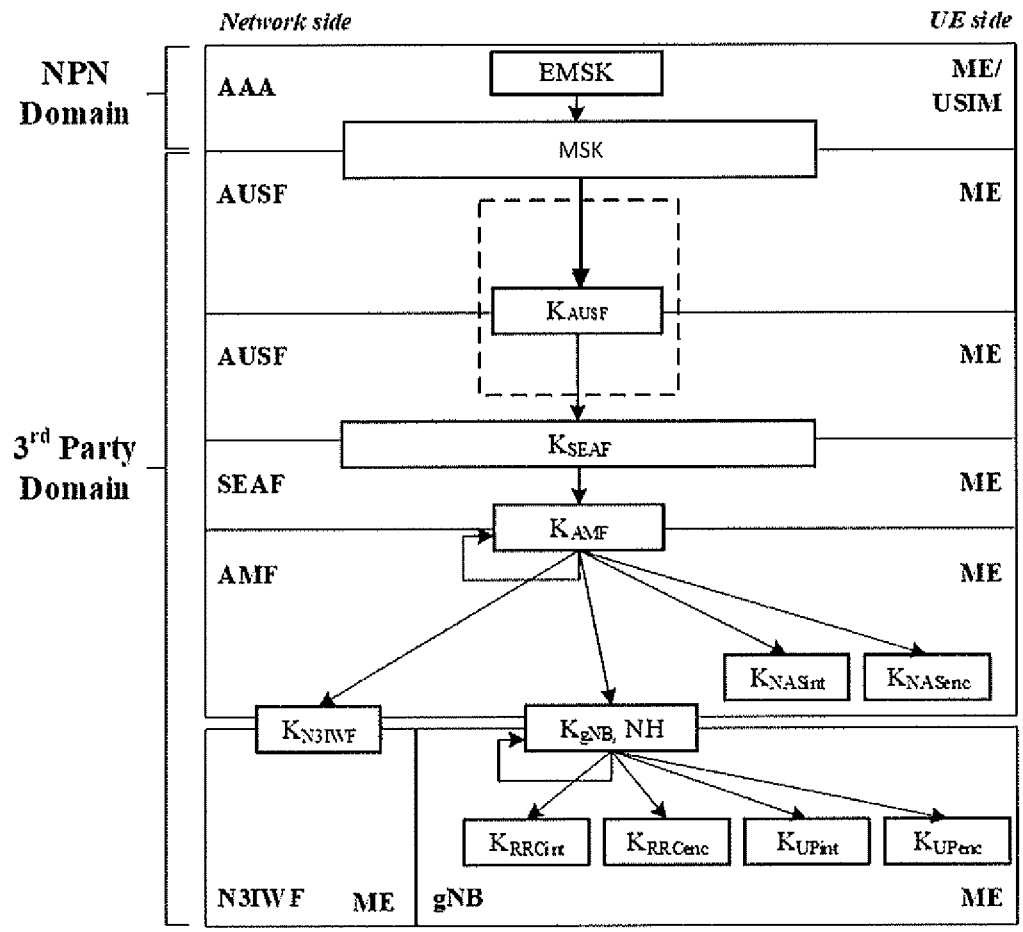

FIG. 6B illustrates a hierarchy of keys according to some embodiments of the inventive concepts. As shown in FIG. 6B, in some embodiments, the $K_{AUSF}$ key is generated by the AUSF based on the MSK provided by the AAA in the NPN domain. The UE generates the $K_{AUSF}$ key using a stored copy of the MSK. The $K_{AUSF}$ key is then used to generate other keys in the hierarchy, including the $K_{SEAF}$ key.

Embodiments Related to Authentication Method Selection and Triggering

Embodiments will now be described with reference to FIG. 7. As shown therein, a UE initiates a connection to a 5G network by sending an initial registration message 702 to the AMF/SEAF in the CN. As described in TS 33.501 [4], when receiving an Initial Registration message from the UE over the N1 interface, the AMF may trigger a Primary Authentication procedure by sending an Authentication Request message 704 to the AUSF. The AMF selects an AUSF in its own 5GC PLMN/Slice based on local configuration or on discovery results from the NF Repository Function (NRF). If NRF is used, the AUSF registers in NRF supporting the subscription identifiers belonging to the NPN domain (i.e. supporting the MNC/MCC or realm of the NPN domain owner).

Figure 7:
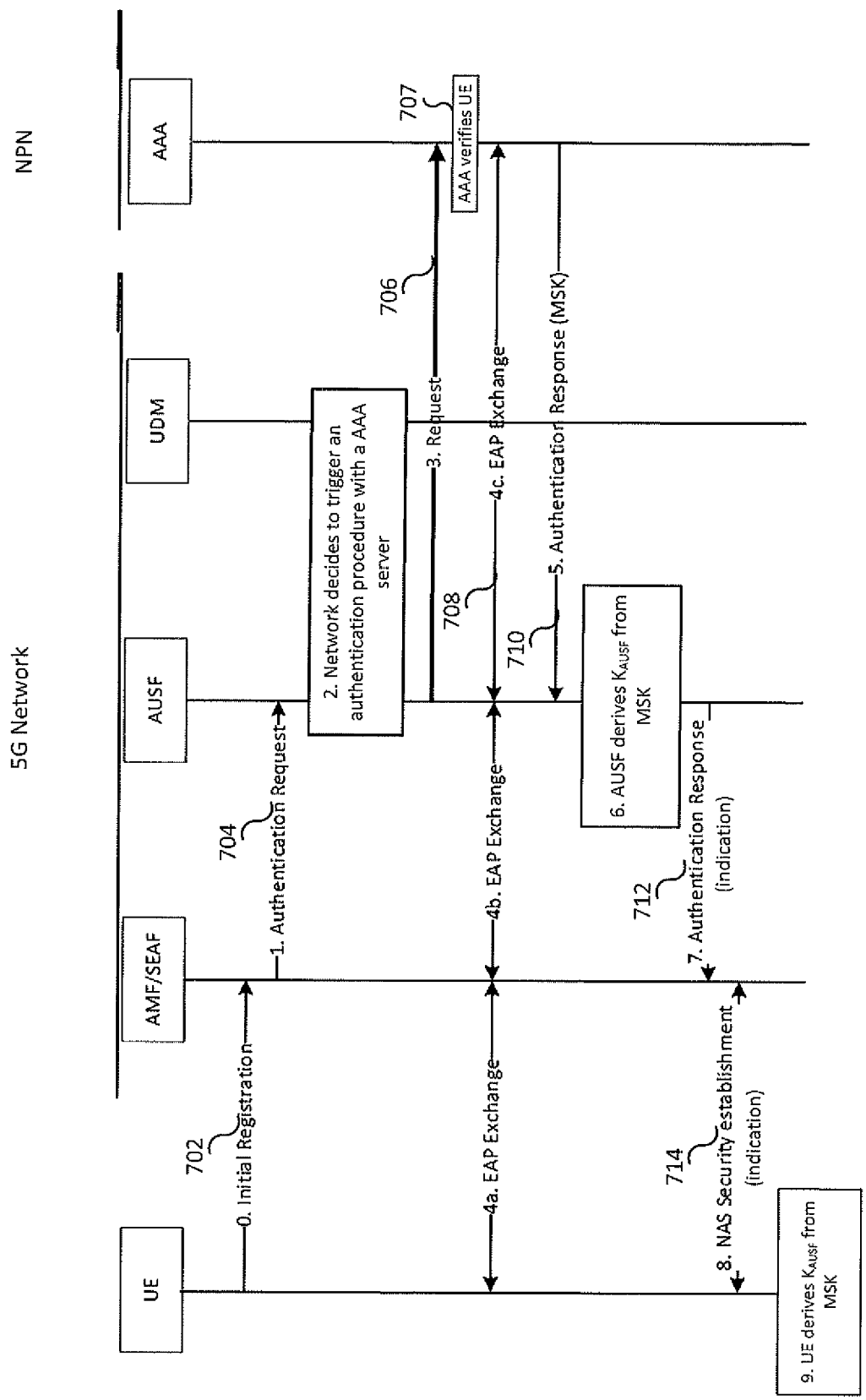
FIG. 7 illustrates an authentication process according to some embodiments.

According to some embodiments, when the initial registration message is received from the UE, the AUSF must first determine that an authentication procedure with an external AAA entity is required (step 2 in FIG. 7). This could be achieved as follows.

Statically: The system may be preconfigured to run all the authentication through a fixed AAA server. Either the AUSF is configured with the address and all needed information to establish a connection with the target AAA entity or the AUSF obtains the address of the AAA server by querying UDM. If the UDM is involved, the UDM provides the authentication method to use and the address of the target AAA entity to the AUSF in the Authentication Response message (step 2 in FIG. 4).

Dynamically: The system resolves which AAA entity to contact dynamically. One possibility is to use the SUCI received from the UE. The AUSF can use the Home Network (HN) Identifier/realm part of the SUCI to determine which AAA entity to contact. Alternatively, the UDM can use the SUCI to indicate to the AUSF which AAA entity to contact in the Authentication Response message.

In either case, the AUSF needs to contact the UDM if the authentication is triggered using a SUCI, so the UDM resolves to the corresponding SUPI.

The AUSF then triggers an authentication procedure with the target AAA entity by sending an authentication request message 706 to the target entity (including the SUR). Subsequently the AUSF acts as a passthrough-authenticator like the AMF/SEAF. It is also possible that the AUSF takes the role of an AAA proxy from the AAA entity perspective. Which role the AUSF endorses in the AAA or EAP framework is less important than what information it sends and receives and how it acts based on such information.

Embodiments Related to Authentication Termination

After receipt of the authentication request 706 by the AAA, EAP authentication messages 708 are then exchanged between the UE and the AAA via the AUSF and the SEAF/AMF. Eventually, when the authentication is successful, the AAA sends a message 710 indicating a successful authentication to the AUSF. Typically, such a message would be carrying an encapsulated EAP Success message to the UE and the MSK key to the AUSF.

Currently for EAP methods and as described in TS 33.501 [4], the AUSF uses the Extended Master Session Key (EMSK) for the derivation of the subsequent keys, which is fine if the AUSF is the authentication server. However, in the embodiments described herein, the AUSF is not the authentication server. As a pass-through authenticator, the AUSF receives the MSK key only in the message 710. According to the RFC, the EMSK key shall never leave the authentication server. Therefore, when the AUSF receives such an indication on a successful authentication, in embodiments described herein, the AUSF uses the received MSK instead of the EMSK key to derive the subsequent keys in the key hierarchy as illustrated in FIG. 6B.

When the AUSF uses the MSK instead of the EMSK for the derivation of the AUSF key, the UE must be informed as well, or otherwise the security establishment will fail. As illustrated in FIG. 7, an indication is sent to the UE in the message 714, possibly alongside any other additional parameters that are used for the derivation of the $K_{AUSF}$ from the MSK.

A detailed description of the flow of FIG. 7 is given below.

Figure 1:
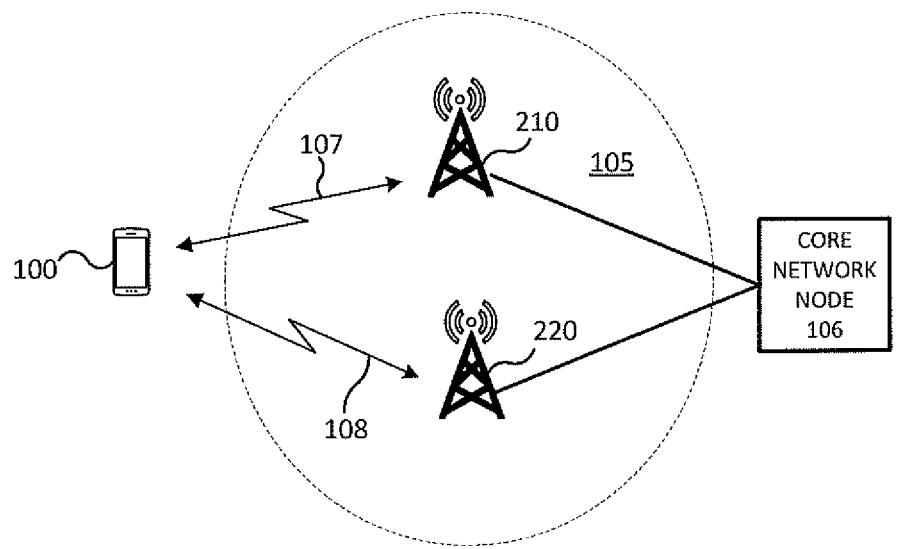
FIG. 1 illustrates a wireless communication system.
Figure 2:
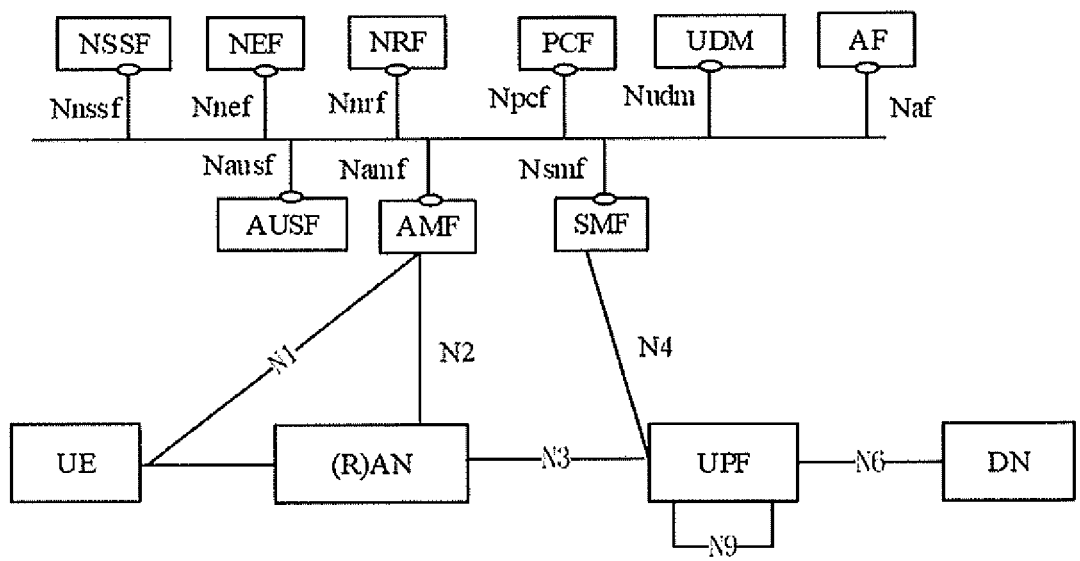
FIG. 2 illustrates a non-roaming reference architecture of a wireless communication system.
Figure 3:
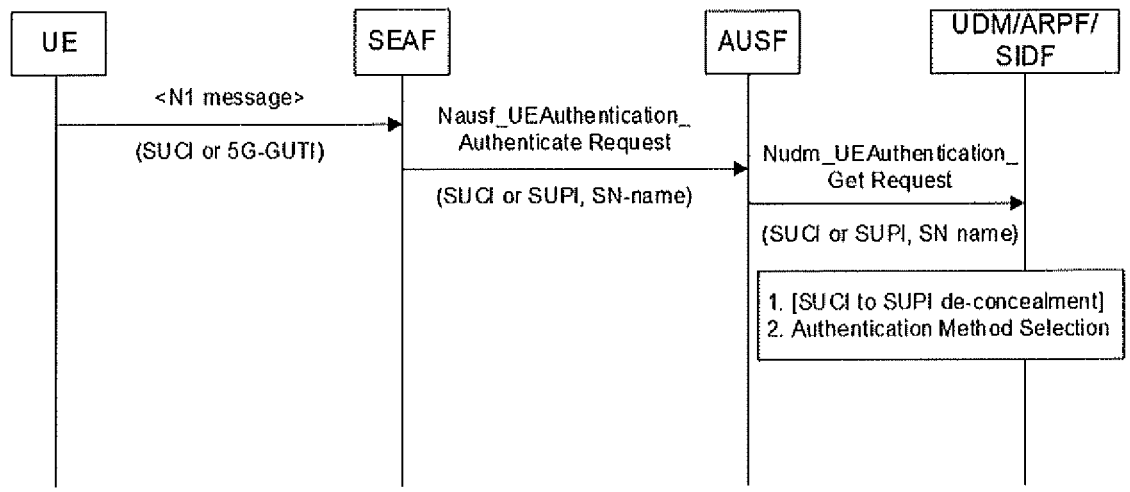
FIG. 3 illustrates a primary authentication initiation procedure.

0. The UE initiates a NAS procedure with the network, e.g. by sending and initial registration request message 702 to the AMF/SEAF including the UE SUCI. This corresponds to the first step in FIG. 2. This is a normal registration procedure in which the UE attempts to register to the AMF/SEAF.
1. Based on the registration request message 702, the AMF decides to trigger a primary authentication procedure. Alternatively, the authentication procedure could be triggered when the UE sends an NAS message or initiates an NAS procedure, which causes the AMF to perform a re-authorization. The AMF sends an authentication request 704 to the AUSF possibly including the SUPI (if already available at the AMF) or the SUCI received from the UE. This corresponds to the second step in FIG. 2 and it is executed using Nausf_UEAuthentication_Authenticate SBA service operation as in the baseline procedure.
2. Either the AUSF or the UDM determines to trigger an authentication procedure involving a AAA entity. For example, this could be performed as described above based on the SUCI or SUPI of the UE, or based on the HN of the UE. The AUSF interacts with the UDM using Nudm_UEAuthentication_Get SBA service operation as in the baseline procedure. As described above, some embodiments provide that the response from UDM may include additional information instructing the AUSF to interact with a AAA server in the NPN domain.
3. The AUSF sends an authentication request 706 to the AAA entity to trigger an EAP authentication with the UE. According to some embodiments, the AUSF in this case is also in charge of translating the SBA based authentication messages to/from the AMF to legacy AAA protocols to/from the AAA entity in the NPN.
4. The AAA and the UE engage in an exchange of EAP messages 708 according to the EAP RFC and the chosen EAP method. During this exchange, the AUSF acts as an EAP authenticator and so does the AMF/SEAF. The AAA verifies the credentials of the UE based on the SUPI provided in the authentication request from information stored in the NPN domain (block 707). As described below, in the EAP message exchange 4a, the AMF may provide the UE with the ABBA parameter, which may be used to signal to the UE that it should derive the $K_{AUSF}$ from the MSK key.
5. Upon a successful authentication the AAA server sends an authentication response message 710 including the MSK key and possibly other IEs, such as an encapsulated EAP Success message, to the AUSF. The MSK key is not provided to the UE by the AUSF. Rather, the UE's knowledge of the MSK key is confirmed during the EAP exchange.
6. The AUSF derives the $K_{AUSF}$ key from the MSK. This could be done by taking the 256 MSBs of the MSK as the $K_{AUSF}$ key or by taking the output of a Key Derivation Function (KDF) applied to the MSK key and possibly another parameter. This key derivation function could use a procedure as described in TS 33.102 [7]. The additional parameter could be a freshness parameter, such as a counter or a nonce or a standardized fixed constant such as the FC parameter used with the KDF specified in TS 33.102 [7].
7. The AUSF then sends an Authentication Response message 712 carrying an EAP success indicator along with indication to instruct UE to derive the $K_{AUSF}$ key from the MSK, possibly along with other parameters, such as the SEAF key (step 10 of FIG. 4). Other keys shown in FIG. 6B are then derived from the $K_{AUSF}$ key.
8. The AMF and the UE establish NAS security via a run of the NAS SMC procedure described in TS 33.501 [4] such that the UE receives the indication of step (7) in the NAS SMC downlink message 714 from the AMF/SEAF.
9. The UE then derives the $K_{AUSF}$ key from a local copy of the MSK.

If an additional parameter is used in the derivation of the $K_{AUSF}$ key as described in step 6, then such a parameter may be signaled alongside the indication of steps 7 and 8. The parameter itself could serve as the indication to instruct the UE how to derive the $K_{AUSF}$ key. If no additional parameter is used, then the indication could simply be a flag.

In another embodiment the UE may be preconfigured to only derive the $K_{AUSF}$ key from the MSK. In that case, there is no need to signal any indication through the AMF/SEAF and the whole procedure becomes totally transparent to the AMF/SEAF. Such a configuration could be per NPN/PLMN identifier. That is, depending on the network identifier, the UE may use the MSK or the EMSK for the derivation of the $K_{AUSF}$ key. That is, in some embodiments, the UE may be pre-configured to use the procedure described herein for deriving the $K_{AUSF}$ key from the MSK rather than the procedure specified in TS 33.501 [4], for example, in cases where the UE is not authorized to connect to other 5G networks or to connect using credentials other than the NPN credentials.

In another embodiment, the indication to the UE to use the MSK to derive the $K_{AUSF}$ (in step 8) may be provided by setting one or more bits in the Anti-Bidding down Between Architectures (ABBA) parameter provided to the UE in the EAP exchange 708. According to TS 33.501 [4], the ABBA parameter is included in every downlink authentication message to the UE (step 4). Thus, it is required that the indication to the AMF/SEAF to set the chosen bits is sent in the first message of step 4c from the AUSF to the AMF/SEAF and then forwarded from the AMF/SEAF to the UE. Alternatively, the indication may be included in every message in step 4c from the AUSF to the AMF/SEAF and then forwarded from the AMF/SEAF to the UE. As a further option, the indication may be included in every message in step 4c from the AUSF to the AMF/SEAF and then forwarded from the AMF/SEAF to the UE, as a separate parameter included together with ABBA.

Embodiments Related to Use of NPN Domain Only for Credential Management

Figure 8:
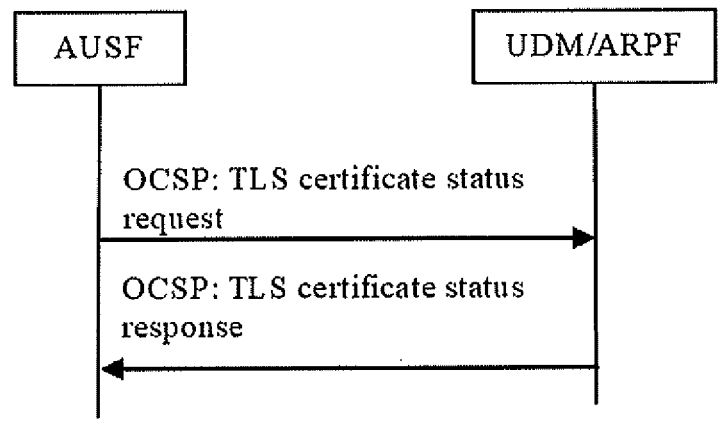
FIG. 8 illustrates a process in which the AUSF requests the status of a TLS certificate from a UDM/ARPF.

According to 3GPP TS 33.501 [4], the UDM/ARPF may perform a certificate revocation service in the 5GC for EAP-TLS. In that case, the UDM/ARPF acts as a Certificate Authority (CA) to revoke the certificates of the corresponding subscription credentials used during primary authentication using EAP-TLS before their scheduled expiration date. This is shown in FIG. 8, which illustrates a process in which the AUSF requests the status of TLS certificate from the UDM/ARPF.

Figure 9:
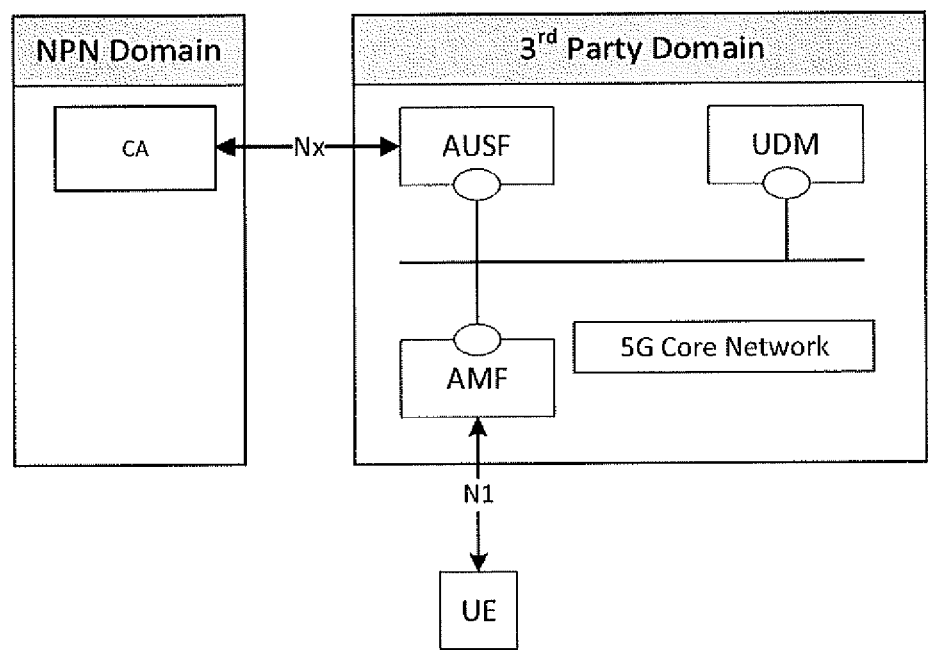
FIG. 9 illustrates an NPN authentication architecture according to further embodiments.

Some embodiments provide an additional alternative approach for authenticating a UE in which the NPN domain does not provide an AAA entity as EAP authentication server, but rather provides a CA that verifies certificates at the request of the AUSF. This is depicted in FIG. 9.

According to this embodiment, the AUSF behaves as EAP Authentication server as in the baseline and may contact the CA in the NPN domain to check revocation status of certificates associated with UEs. The UDM can indicate to the AUSF the contact details of the CA to use.

The interactions between the AUSF and the certificate revocation service offered by the CA can be as defined in in TS 33.501 [4] when UDM/ARPF acts as CA (e.g. using the Online Certificate Status Protocol (OCSP)).

In this embodiment, key generation proceeds according to the baseline approach of TS 33.501 [4], i.e., the $K_{AUSF}$ key is generated as illustrated in FIG. 6A. The AUSF verifies the UE by making a request to the CA in the NPN domain to check the revocation status of the certificate associated with the UE. If the CA verifies that the certificate is valid, then authentication of the UE proceeds as normal.

This model can also apply to EAP methods other than EAP-TLS where the NPN domain would only enable a credential repository function.

Figure 10A:
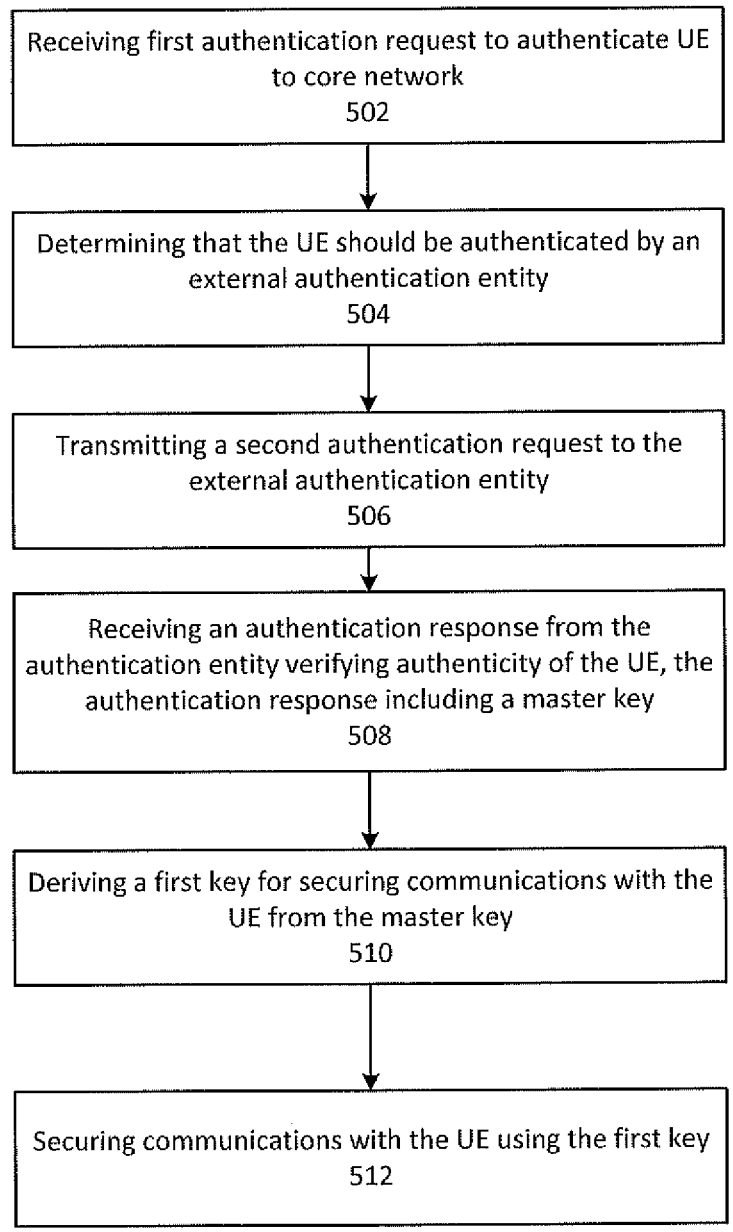
FIGS. 10A, 10B and 11 are flow charts illustrating operations of an LLS-CU according to some embodiments.

Operations of a core network node, such as an AUSF node, according to some embodiments are illustrated in FIG. 10A. As shown therein, a method by a core network node of a core network of a wireless communication system for authenticating a user equipment, UE, to the core network, includes receiving (502) a first authentication request to authenticate the UE to the core network, determining (504) that the UE should be authenticated by an external authentication entity that is external to the wireless communication system, transmitting (506) a second authentication request to the external authentication entity, the second authentication request identifying the UE, receiving (508) an authentication response from the authentication entity verifying authenticity of the UE, the authentication response including a master key, deriving (510) a first key for securing communications with the UE from the master key, and securing (512) communications with the UE using the first key.

Figure 10B:
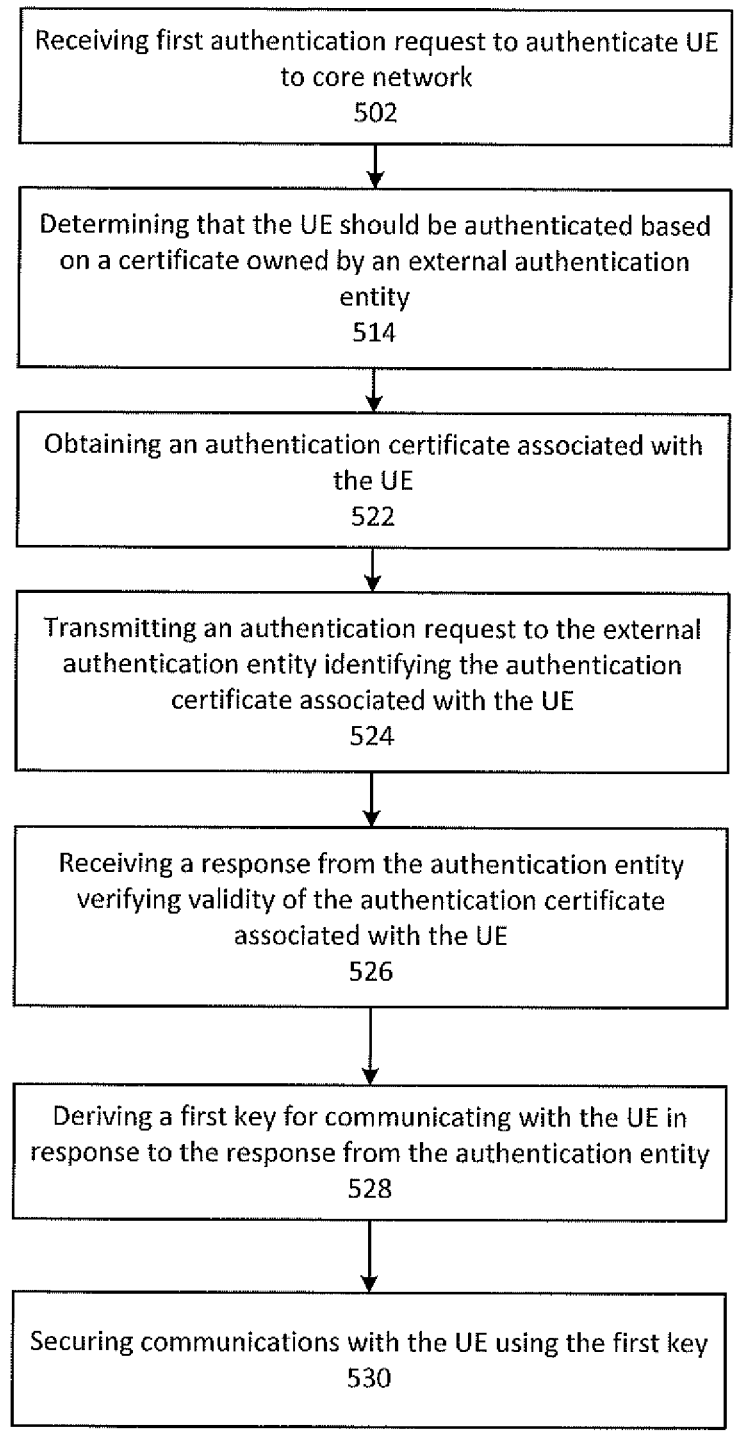

Operations of a core network node, such as an AUSF node, according to further embodiments are illustrated in FIG. 10B. As shown therein, a method by a core network node of a core network of a wireless communication system for authenticating a user equipment, UE, to the core network, includes receiving (502) a first authentication request to authenticate the UE to the core network, determining (514) that the UE should be authenticated based on a certificate owned by an external authentication entity that is external to the wireless communication system, obtaining (522) an authentication certificate associated with the UE, transmitting (524) a second authentication request to the external authentication entity, the second authentication request identifying the authentication certificate associated with the UE, receiving (526) an authentication response from the authentication entity verifying validity of the authentication certificate associated with the UE, deriving (528) a first key for communicating with the UE in response to the authentication response, and securing (530) communications with the UE using the first key.

Figure 11:
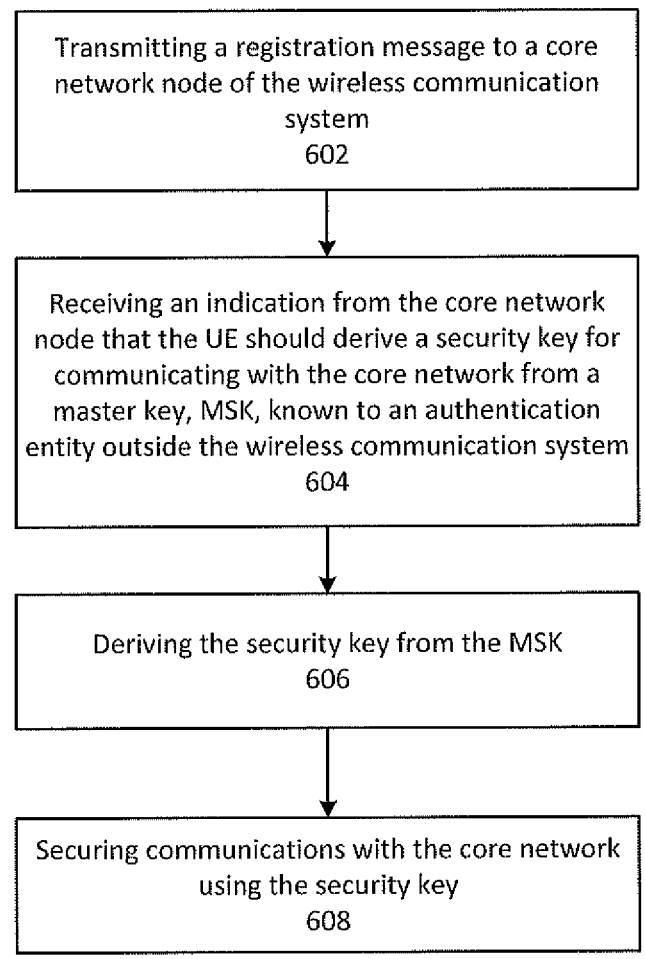

Operations of a user equipment according to some embodiments are illustrated in FIG. 11. As shown therein, a method by a UE in a wireless communication system includes transmitting (602) a registration message to a core network node of the wireless communication system, receiving (604) an indication from the core network node that the UE should derive a security key for communicating with the core network from a master key, MSK, known to an authentication entity outside the wireless communication system, deriving (606 the security key from the MSK, and securing (608) communications with the core network node using the security key.

Various embodiments provide a UE 100 that includes a processor circuit, a transceiver coupled to the processor circuit, and a memory coupled to the processor circuit. The memory includes machine-readable computer program instructions that, when executed by the processor circuit, cause the processor circuit to perform some of the operations depicted in FIG. 11.

Figure 12:
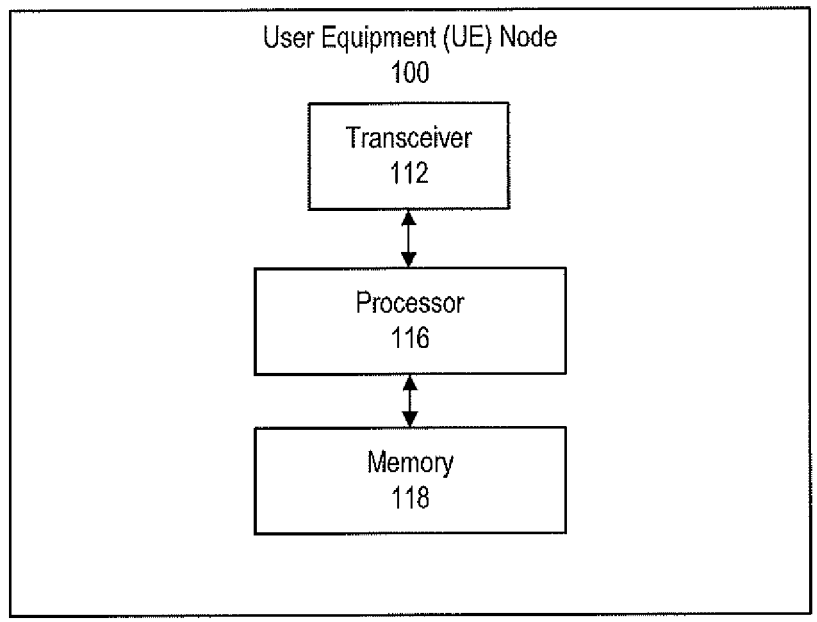
FIG. 12 is a block diagram illustrating an example of a user equipment (UE) node according to some embodiments.

FIG. 12 depicts an example of a UE 100 of a wireless communication network configured to provide wireless communication according to embodiments of inventive concepts. As shown, the UE 100 may include a transceiver circuit 112 (also referred to as a transceiver) including a transmitter and a receiver configured to provide uplink and downlink radio communications with wireless devices. The UE 100 may also include a processor circuit 116 (also referred to as a processor) coupled to the transceiver circuit 112, and a memory circuit 118 (also referred to as memory) coupled to the processor circuit 116. The memory circuit 118 may include computer readable program code that when executed by the processor circuit 116 causes the processor circuit to perform operations according to embodiments disclosed herein. According to other embodiments, processor circuit 116 may be defined to include memory so that a separate memory circuit is not required.

As discussed herein, operations of the UE 100 may be performed by processor 116 and/or transceiver 112. For example, the processor 116 may control transceiver 112 to transmit uplink communications through transceiver 112 over a radio interface to one or more network nodes and/or to receive downlink communications through transceiver 112 from one or more network nodes over a radio interface. Moreover, modules may be stored in memory 118, and these modules may provide instructions so that when instructions of a module are executed by processor 116, processor 116 performs respective operations (e.g., operations discussed above with respect to example embodiments).

Accordingly, a UE 100 according to some embodiments includes a processor circuit 116, a transceiver 112 coupled to the processor circuit, and a memory 118 coupled to the processor circuit, the memory including machine readable program instructions that, when executed by the processor circuit, cause the UE to perform operations described above.

Figure 13:
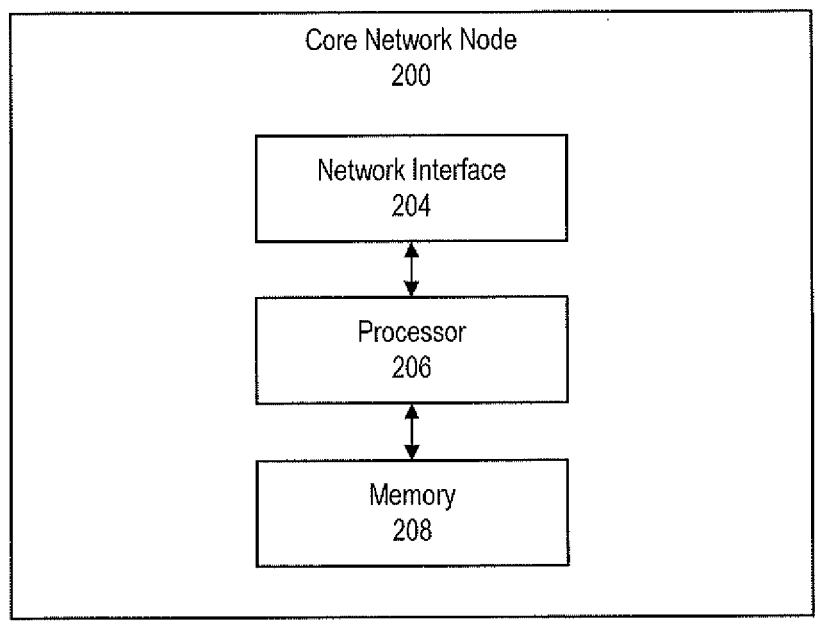
FIG. 13 is a block diagram illustrating an example of a radio access network (RAN) node according to some embodiments.

FIG. 13 is a block diagram of a network node according to some embodiments. Various embodiments provide a core network node that includes a processor circuit 206 and a memory 208 coupled to the processor circuit. The memory 208 includes machine-readable computer program instructions that, when executed by the processor circuit, cause the processor circuit to perform some of the operations depicted in FIGS. 10A and 10B.

FIG. 13 depicts an example of a core network node 200 of a wireless communication network configured to provide cellular communication according to embodiments of inventive concepts. The network node 200 may include a network interface circuit 204 (also referred to as a network interface) configured to provide communications with other nodes (e.g., with other base stations and/or core network nodes) of the wireless communication network. The memory circuit 208 may include computer readable program code that when executed by the processor circuit 206 causes the processor circuit to perform operations according to embodiments disclosed herein. According to other embodiments, processor circuit 206 may be defined to include memory so that a separate memory circuit is not required.

As discussed herein, operations of the network node 200 may be performed by processor 206 and/or network interface 204. For example, processor 206 may control network interface 204 to transmit communications through network interface 204 to one or more other network nodes and/or to receive communications through network interface from one or more other network nodes. Moreover, modules may be stored in memory 208, and these modules may provide instructions so that when instructions of a module are executed by processor 206, processor 206 performs respective operations. In addition, a structure similar to that of FIG. 13 may be used to implement other network nodes. Moreover, network nodes discussed herein may be implemented as virtual network nodes.

Listing of Example Embodiments

Example Embodiments are discussed below. Reference numbers/letters are provided in parenthesis by way of example/illustration without limiting example embodiments to particular elements indicated by reference numbers/letters.

Embodiment 1. A method by a core network node of a core network of a wireless communication system for authenticating a user equipment, UE, to the core network, comprising:
  receiving a first authentication request to authenticate the UE to the core network;
  determining that the UE should be authenticated by an external authentication entity that is external to the wireless communication system;
  transmitting a second authentication request to the external authentication entity, the second authentication request identifying the UE;
  receiving an authentication response from the authentication entity verifying authenticity of the UE, the authentication response including a master key; and
  deriving a first key for securing communications with the UE from the master key.

Embodiment 2. The method of Embodiment 1, further comprising: performing an extensible authentication protocol, EAP, exchange, with the authentication entity after transmitting the authentication request to the authentication entity.

Embodiment 3. The method of Embodiment 1, wherein the core network node comprises a first core network node, the method further comprising:
  transmitting an identifier associated with the UE to a second core network node in response to receiving the message from the UE; and
  receiving a message from the second core network node instructing the core network node to transmit the authentication request to the authentication entity.

Embodiment 4. The method of Embodiment 3, wherein the core network comprises a 5GC core network, wherein the first core network node comprises a Authentication Server Function, AUSF, node, and wherein the second core network node comprises a Unified Data Management, UDM, node.

Embodiment 5. The method of any preceding embodiment, wherein the external authentication entity is associated with a non-public network.

Embodiment 6. The method of any preceding embodiment, wherein the first authentication request includes a subscriber concealed identity, SUCI, of the UE, the method further comprising:
  determining a subscriber permanent identity, SUPI, of the UE, wherein determining that the UE should be authenticated by the external authentication entity is performed based on the SUCI or the SUPI of the UE.

Embodiment 7. The method of any preceding embodiment, wherein determining that the UE should be authenticated by the external authentication entity is performed based on a home network of the UE.

Embodiment 8. The method of Embodiment 1, wherein:
  the core network comprises a 5GC core network;
  the core network node comprises a Authentication Server Function, AUSF, node;
  the master key comprises a master session key, MSK; and
  the first key comprises an AUSF security key, $K_{AUSF}$.

Embodiment 9. The method of any previous embodiment, further comprising:
  transmitting an indication to the UE to derive the first key from the master key.

Embodiment 10. The method of any previous embodiment, wherein determining that the UE should be authenticated by the external authentication entity is performed according to a predetermined static configuration.

Embodiment 11. The method of any previous embodiment, wherein the authentication response message includes an encapsulated message for the UE indicating successful authentication.

Embodiment 12. The method of Embodiment 2, further comprising:
  transmitting an indication to the UE to derive the first key from the master key in an EAP message in the EAP exchange.

Embodiment 13. The method of Embodiment 12, wherein transmitting the indication comprises transmitting the indication in an Anti-Bidding down Between Architectures, ABBA, parameter.

Embodiment 14. The method of any previous embodiment, wherein the first authentication request is received from an Access and Mobility Management Function, AMF, node, in the core network.

Embodiment 15. A method by a core network node of a 5GC core network of a 5G wireless communication system for authenticating a user equipment, UE, to the core network, comprising:
  receiving a first authentication request to authenticate the UE to the core network;
  determining that the UE should be authenticated by an external authentication entity that is external to the wireless communication system;
  obtaining an authentication certificate associated with the UE;
  transmitting a second authentication request to the external authentication entity, the second authentication request identifying the authentication certificate associated with the UE;
  receiving an authentication response from the authentication entity verifying validity of the authentication certificate associated with the UE; and
  deriving a first key for communicating with the UE in response to the authentication response.

Embodiment 16. A network node, comprising:
a processor circuit;
a transceiver coupled to the processor circuit; and
a memory coupled to the processor circuit, the memory comprising machine readable program instructions that, when executed by the processor circuit, cause the UE to perform operations comprising operations according to any of Embodiments 1 to 15.

Embodiment 17. A method by a UE in a wireless communication system, comprising:
transmitting a registration message to a core network node of the wireless communication system;
receiving an indication from the core network node that the UE should derive a security key for communicating with the core network from a master key, MSK, known to an authentication entity outside the wireless communication system;
deriving the security key from the MSK; and
securing communications with the core network node using the security key.

Embodiment 18. The method of Embodiment 17, wherein the indication is received in a non-access stratum security establishment message from the core network node.

Embodiment 19. The method of Embodiment 18, wherein the indication is received as part of an extensible authentication protocol, EAP, exchange performed in response to the registration message.

Embodiment 20. The method of Embodiment 19, wherein the indication is received in an Anti-Bidding down Between Architectures, ABBA, parameter, of an EAP message received as part of the EAP exchange.

Embodiment 21. The method of any of Embodiments 17 to 20, wherein the security key comprises a Authentication Server Function, AUSF, key, $K_{AUSF}$.

Embodiment 22. A user equipment, UE, comprising:
a processor circuit;
a transceiver coupled to the processor circuit; and
a memory coupled to the processor circuit, the memory comprising machine readable program instructions that, when executed by the processor circuit, cause the UE to perform operations according to any of Embodiments 17 to 21.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14:
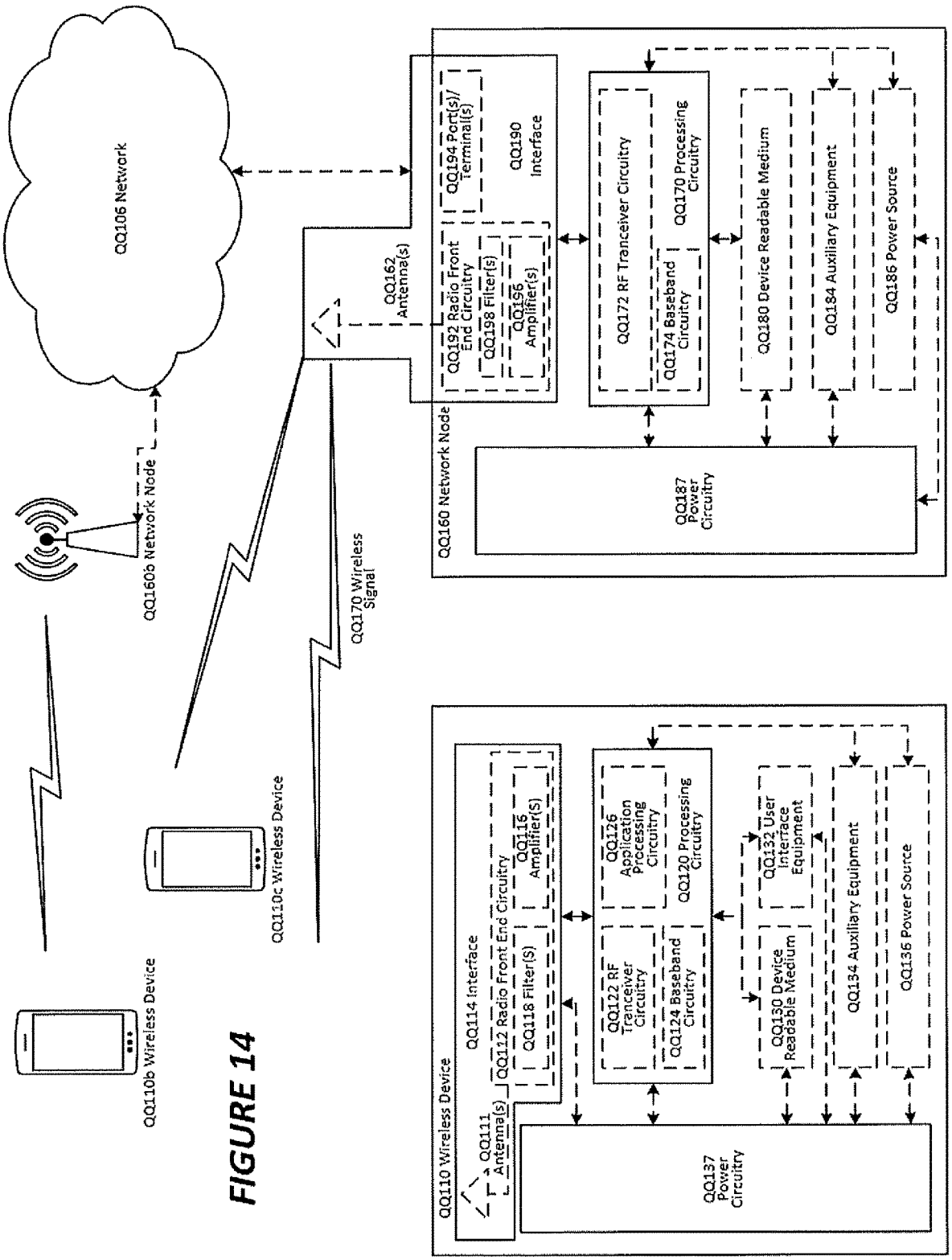
FIG. 14 is a block diagram of a wireless network in accordance with some embodiments.

FIG. 14: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 14, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 14 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/ buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
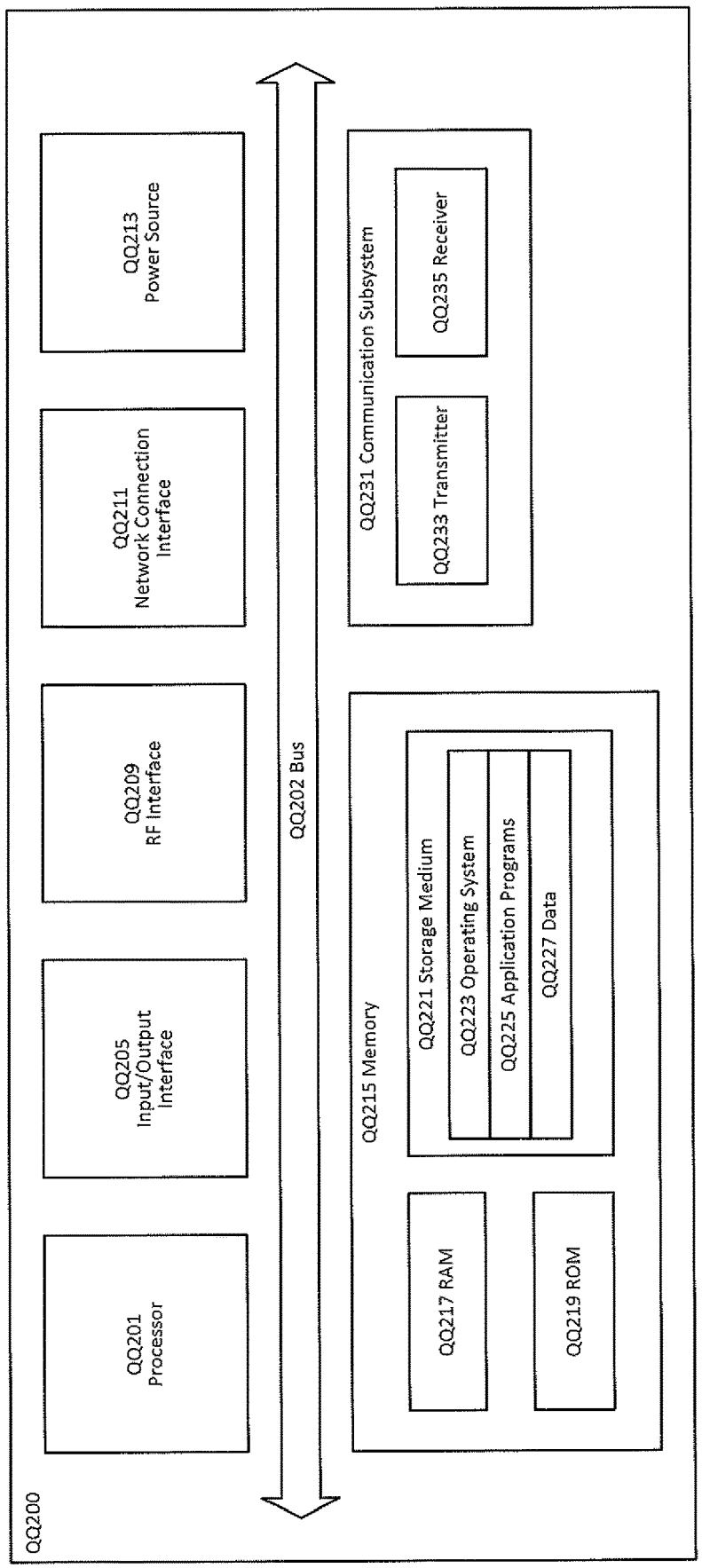
FIG. 15 is a block diagram of a user equipment in accordance with some embodiments

FIG. 15: User Equipment in Accordance with Some Embodiments

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
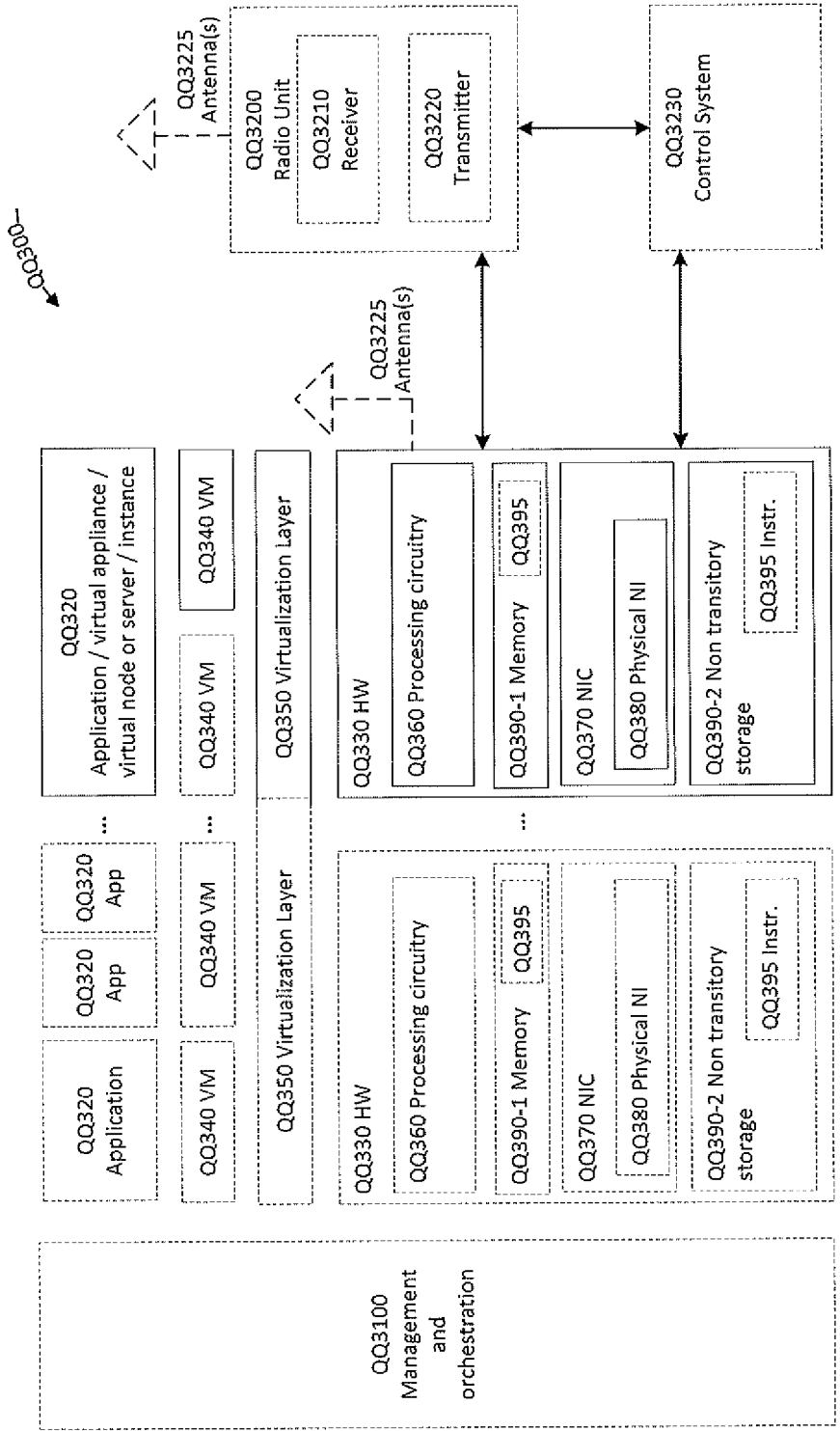
FIG. 16 is a block diagram of a virtualization environment in accordance with some embodiments.

FIG. 16: Virtualization Environment in Accordance with Some Embodiments

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 16.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 17:
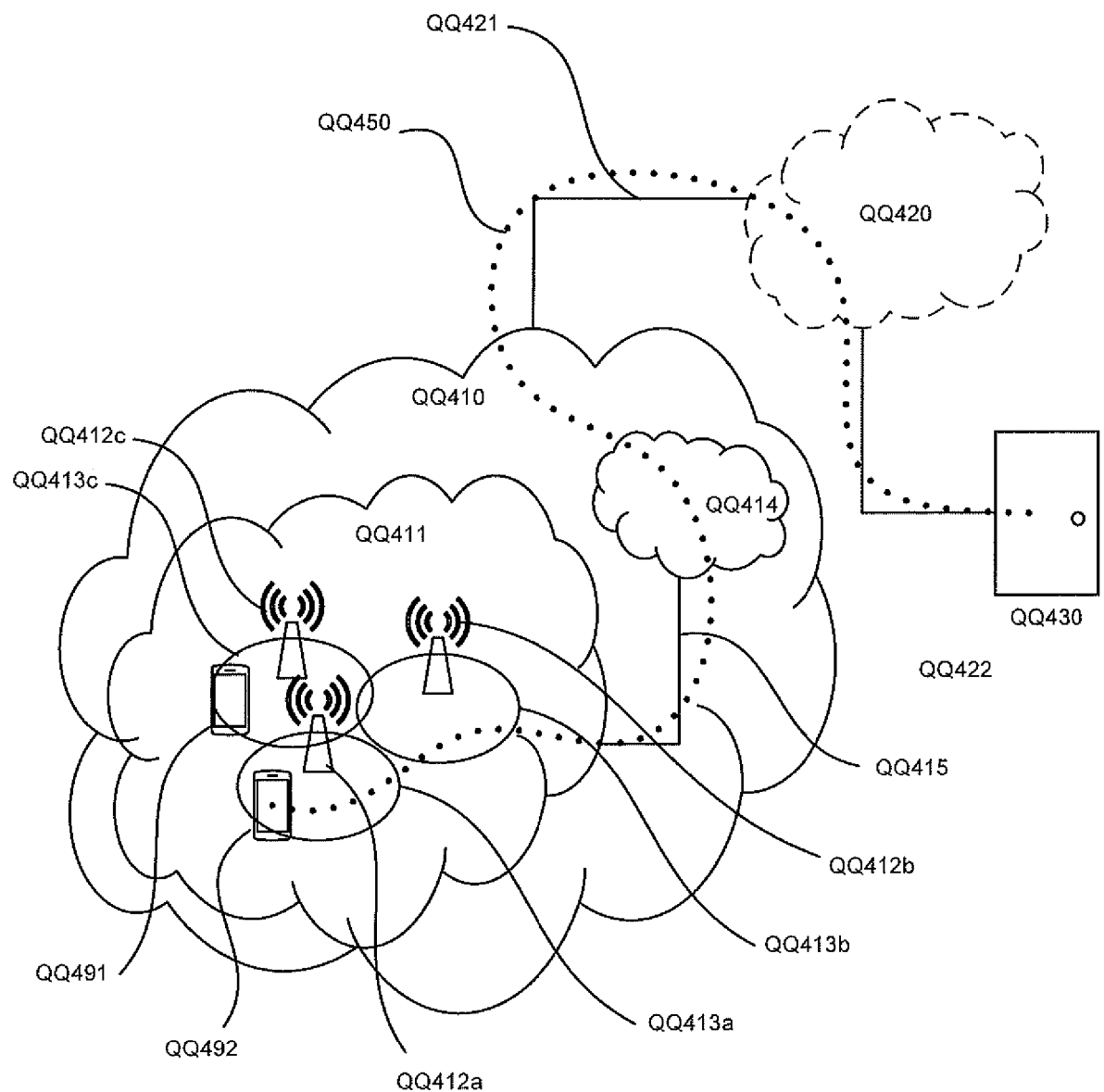
FIG. 17 is a block diagram of a telecommunication network connected via an intermediate network to a host computer in accordance with some embodiments.

FIG. 17: Telecommunication network connected via an intermediate network to a host computer in accordance with some embodiments.

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, 00492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 18:
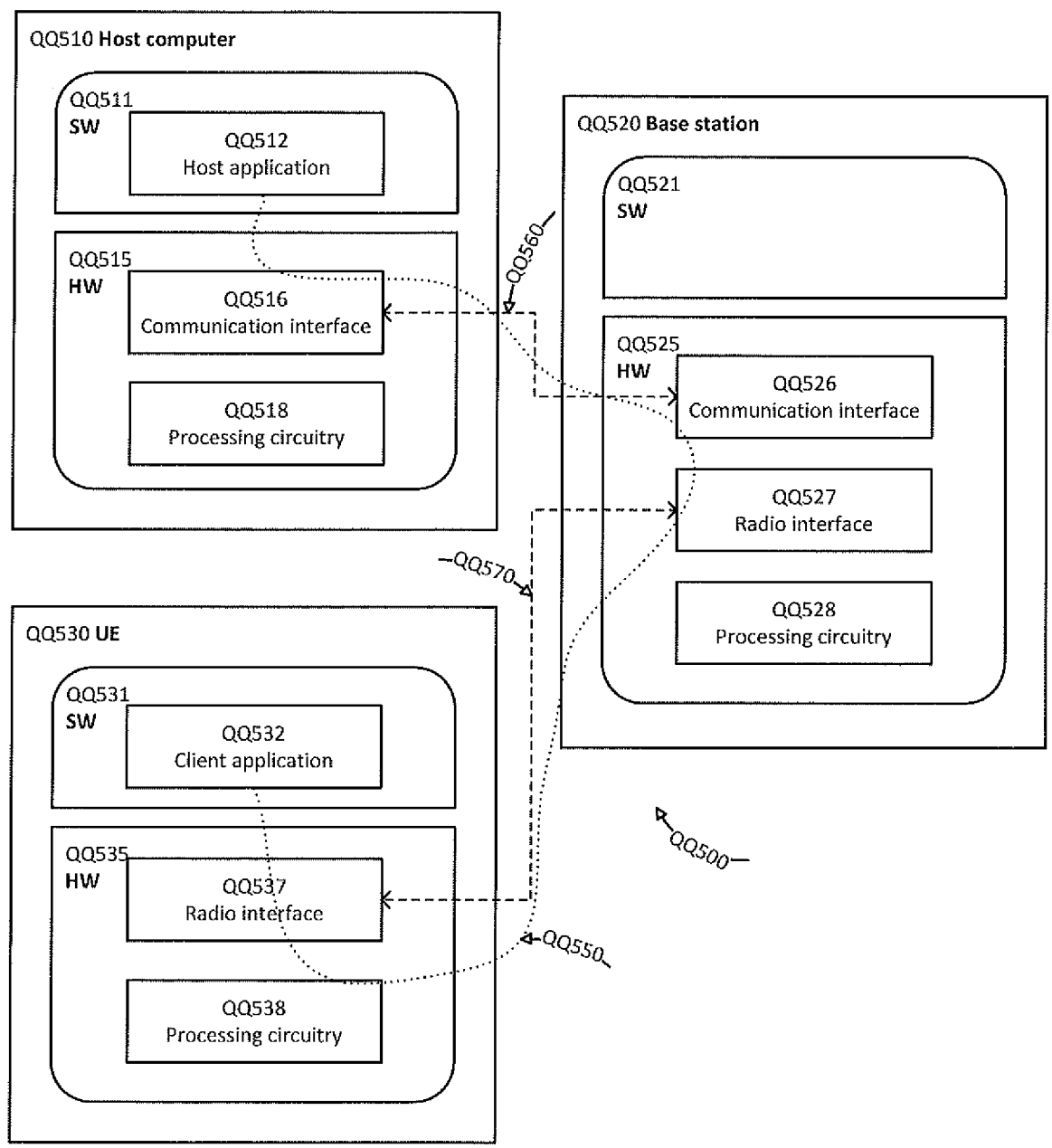
FIG. 18 is a block diagram of a host computer communicating via a base station with a user equipment over a partially wireless connection in accordance with some embodiments.

FIG. 18: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 19:
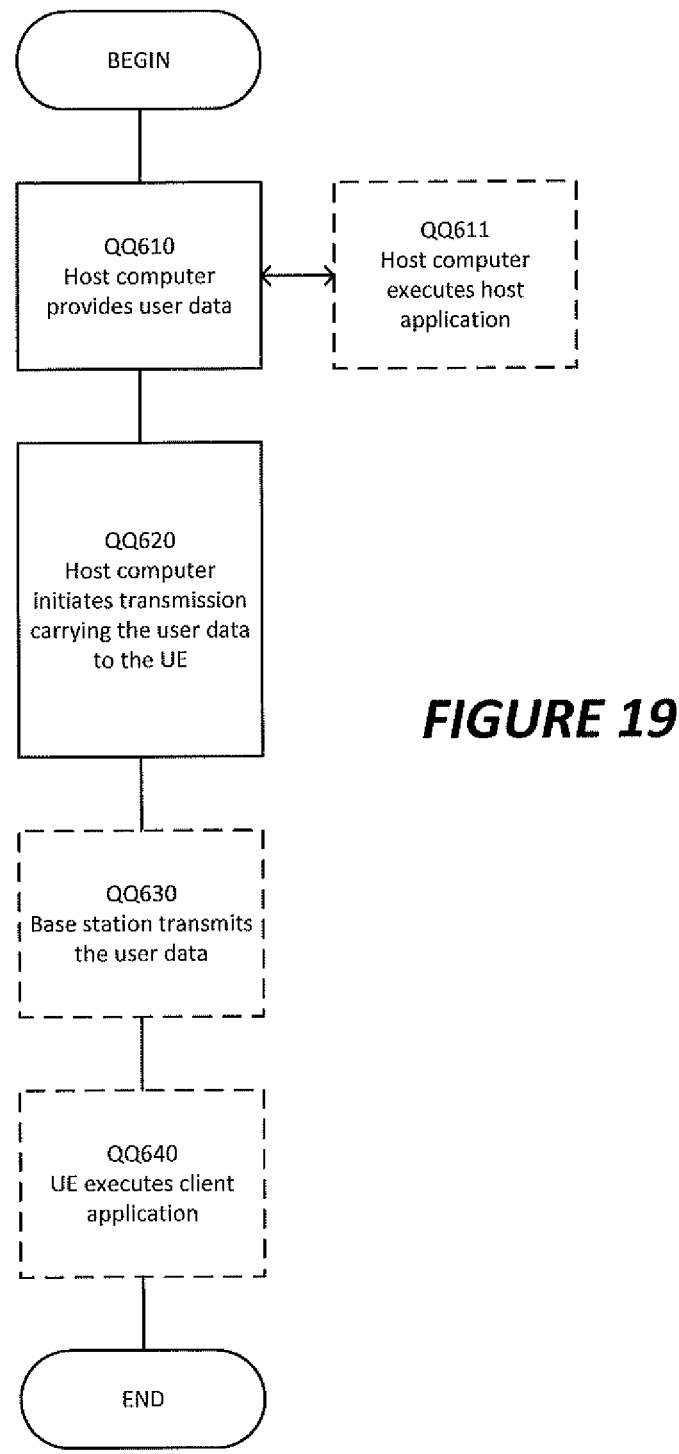
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 20:
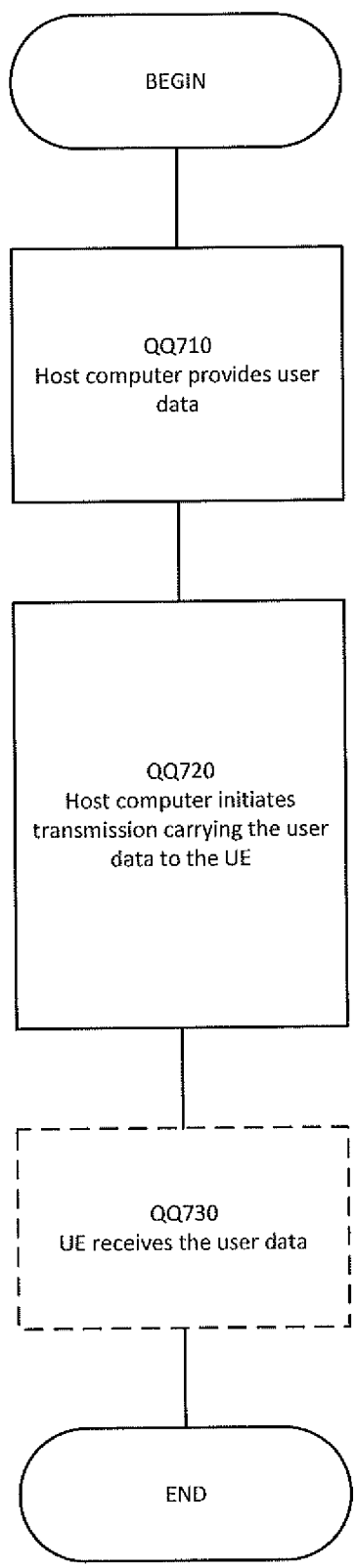
FIG. 20 is a block diagram of methods implemented in a communication system including a host computer, a base station, and a user equipment in accordance with some embodiments.

FIG. 20: Methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21:
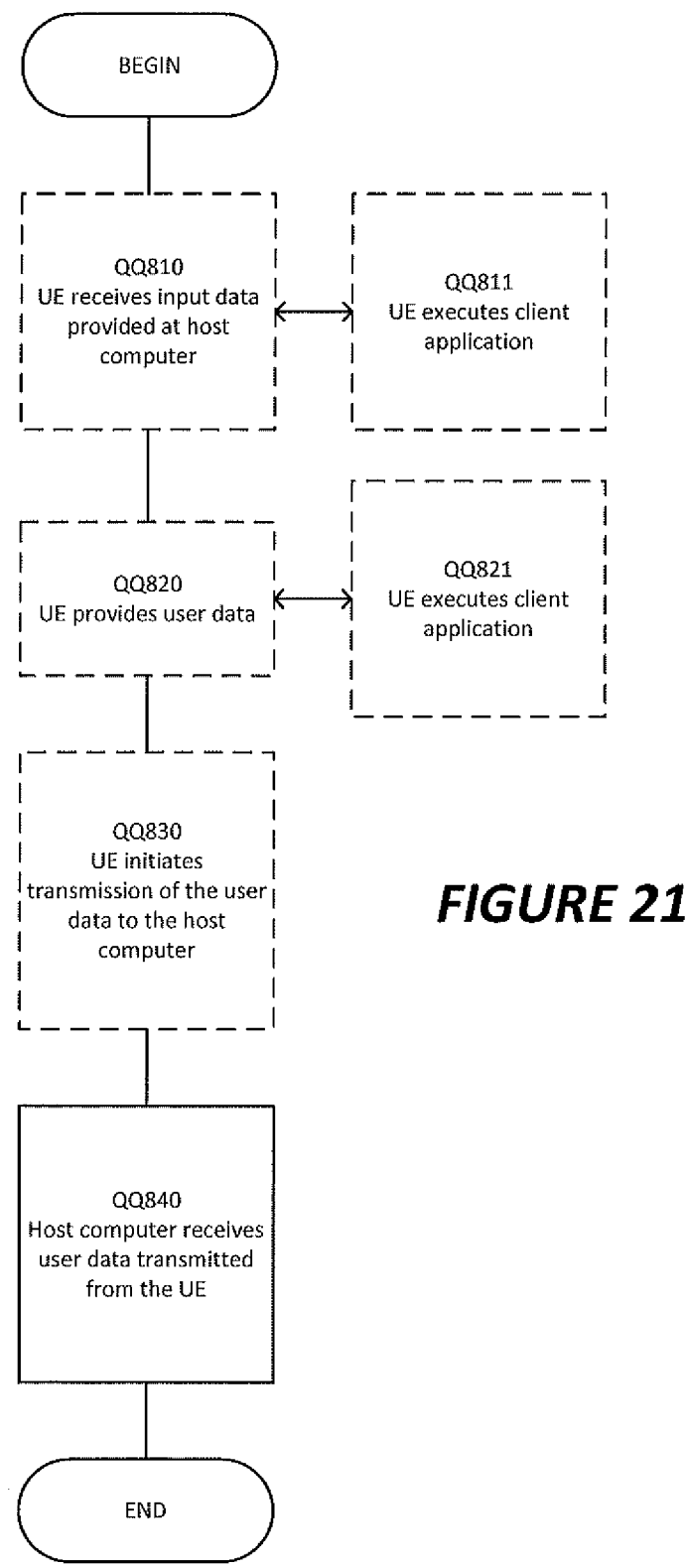
FIG. 21 is a block diagram of methods implemented in a communication system including a host computer, a base station, and a user equipment in accordance with some embodiments.

FIG. 21: Methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 22:
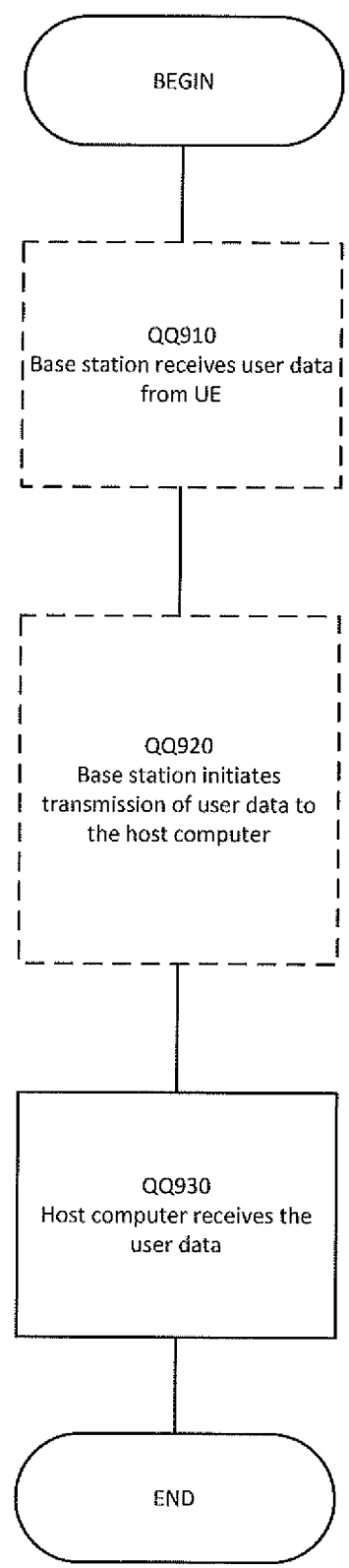
FIG. 22 is a block diagram of methods implemented in a communication system including a host computer, a base station, and a user equipment in accordance with some embodiments.

FIG. 22: Methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Explanations for abbreviations from the above disclosure are provided below.

| Abbreviation | Explanation |
| --- | --- |
| 3GPP | 3rd Generation Partnership Project |
| 5G | 5th Generation |
| AAA | Authentication, Authorization and Accounting |
| ABBA | Anti-Bidding down Between Architectures |
| AF | Application Function |
| AKA | Authentication and Key Agreement |
| AMF | Access and Mobility Management Function |
| AN | Access Network |
| AUSF | Authentication Server Function |
| ARPF | Authentication credential Repository and Processing Function |
| AS | Access Stratum |
| AV | Authentication Vector |
| CA | Certificate Authority |
| CN | Core Network |
| C-RNTI | Cell Radio Network Temporary Identifier |
| DN | Data Network |
| EAP | Extensible Authentication Protocol |
| EMSK | Extended Master Session Key |
| eNB | Evolved NodeB (a radio base station in LTE) |
| gNB | A radio base station in NR. |
| HPLMN | Home PLMN |
| HN | Home Network |
| IETF | Internet Engineering Task Force |
| KDF | Key Derivation Function |
| LTE | Long Term Evolution |
| MSB | Most Significant Bit |
| MSK | Master Session Key |
| ME | Mobile Equipment |
| MNC | Mobile Network Code |
| MCC | Mobile Country Code |
| NAS | Non-Access Stratum |
| NF | Network Function |
| NRF | NF Repository Function |
| NEF | Network Exposure Function |
| NSSF | Network Slice Selection Function |
| NPN | Non-Public Network |
| NR | New Radio |
| OCSP | Online Certificate Status Protocol |
| PCF | Policy Control Function |
| PLMN | Public Land Mobile Network |
| RAN | Radio Access Network |
| RFC | Request for Comments |
| SBA | Service Based Architecture |
| SLA | Service Level Agreement |
| SMF | Session Management Function |
| SEAF | SEcurity Anchor Function |
| SUPI | Subscriber Permanent Identity |
| SUCI | Subscriber Concealed Identity |
| TLS | Transaction Layer Security |
| USIM | Universal Subscriber Identity Module |
| UDM | Unified Data Management |
| UPF | User Plane Function |
| UE | User Equipment |
| VPLMN | Visitor PLMN |
| X2 | Interface/reference point between two eNBs. |
| Xn | Interface/reference point between two gNBs. |

REFERENCES

[1] TR 33.819 v 0.2.0
[2] TR 23.734 v 16.0.0
[3] TS 23.501 v 15.4.0
[4] TS 33.501 v 15.3.1
[5] TS 33.401 v 15.6.0
[6] TS 23.502 v 15.4.1
[7] RFC 5448, May 2009

The invention claimed is:

1. A method by a first core network node of a core network of a wireless communication system for authenticating a user equipment, UE, to the core network, comprising:
receiving a first authentication request to authenticate the UE to the core network;

transmitting an identifier associated with the UE to a second core network node in response to receiving the first authentication request;
receiving a message from the second core network node instructing the first core network node to transmit the authentication request to an external authentication entity;
determining that the UE should be authenticated by the external authentication entity that is external to the wireless communication system;
transmitting a second authentication request to the external authentication entity, the second authentication request identifying the UE;
receiving an authentication response from the external authentication entity verifying authenticity of the UE, the authentication response including a master key; and
deriving a first key for securing communications with the UE from the master key.

2. The method of claim 1, further comprising:
performing an extensible authentication protocol, (EAP) exchange, with the external authentication entity after transmitting the authentication request to the external authentication entity.

3. The method of claim 2, further comprising:
transmitting an indication to the UE to derive the first key from the master key in an EAP message in the EAP exchange.

4. The method of claim 3, wherein transmitting the indication comprises transmitting the indication in an Anti-Bidding down Between Architectures (ABBA) parameter.

5. The method of claim 1, wherein the core network comprises a 5GC core network, wherein the first core network node comprises a Authentication Server Function (AUSF) node, and wherein the second core network node comprises a Unified Data Management, (UDM) node.

6. The method of claim 1, wherein the external authentication entity is associated with a non-public network.

7. The method of claim 1, wherein the first authentication request includes a subscriber concealed identity, SUCI, of the UE, the method further comprising:
determining a subscriber permanent identity, SUPI, of the UE, wherein determining that the UE should be authenticated by the external authentication entity is performed based on the SUCI or the SUPI of the UE.

8. The method of claim 1, wherein determining that the UE should be authenticated by the external authentication entity is performed based on a home network of the UE.

9. The method of claim 1, wherein:
the core network comprises a 5GC core network;
the first core network node comprises a Authentication Server Function, AUSF, node;
the master key comprises a master session key, MSK; and
the first key comprises an AUSF security key, $K_{AUSF}$.

10. The method of claim 1, further comprising:
transmitting an indication to the UE to derive the first key from the master key.

11. The method of claim 1, wherein determining that the UE should be authenticated by the external authentication entity is performed according to a predetermined static configuration.

12. The method of claim 1, wherein the authentication response includes an encapsulated message for the UE indicating successful authentication.

13. The method of claim 1, wherein the first authentication request is received from an Access and Mobility Management Function (AMF) node in the core network.

14. A network node, comprising:
a first core network;
a processor circuit;
a transceiver coupled to the processor circuit; and
a memory coupled to the processor circuit, the memory comprising machine readable program instructions that, when executed by the processor circuit, cause the network node to perform operations of:
receiving first authentication request to authenticate the UE to a core network;
transmitting an identifier associated with the UE to a second core network node in response to receiving the first authentication request;
receiving a message from the second core network node instructing the first core network node to transmit the authentication request to an external authentication entity;
determining that the UE should be authenticated by the external authentication entity that is external to a wireless communication system that includes the core network;
transmitting a second authentication request to the external authentication entity, the second authentication request identifying the UE;
receiving an authentication response from the external authentication entity verifying authenticity of the UE, the authentication response including a master key; and
deriving a first key for securing communications with the UE from the master key.

15. A method by a user equipment, UE, in a wireless communication system, comprising:
transmitting a registration message to a core network node of the wireless communication system;
receiving an indication from the core network node that the UE should derive a security key for communicating with the core network from a master key (MSK) known to an authentication entity outside the wireless communication system;
deriving the security key from the MSK; and
securing communications with the core network node using the security key.

16. The method of claim 15, wherein the indication is received in a non-access stratum security establishment message from the core network node.

17. The method of claim 16, wherein the indication is received as part of an extensible authentication protocol (EAP) exchange performed in response to the registration message.

18. The method of claim 17, wherein the indication is received in an Anti-Bidding down Between Architectures (ABBA) parameter, of an EAP message received as part of the EAP exchange.

19. The method of claim 15, wherein the security key comprises a Authentication Server Function (AUSF) key ($K_{AUSF}$).

20. A user equipment, UE, comprising:
a processor circuit;
a transceiver coupled to the processor circuit; and
a memory coupled to the processor circuit, the memory comprising machine readable program instructions that, when executed by the processor circuit, cause the UE to perform operations of:
transmitting a registration message to a core network node of wireless communication system;
receiving an indication from the core network node that the UE should derive a security key for communicating with the core network from a master key (MSK) known to an authentication entity outside the wireless communication system;

deriving the security key from the MSK; and securing communications with the core network node using the security key.

* * * * *